US012636531B2

(12) United States Patent
Gieseke et al.

(10) Patent No.: US 12,636,531 B2
(45) Date of Patent: May 26, 2026

(54) FIRE PROTECTION SYSTEM FOR FIRE PROTECTION FOR LIQUID HAZARDOUS GOODS AND CORRESPONDING METHOD

(71) Applicant: Minimax Viking Patent Management GmbH, Bad Oldesloe (DE)

(72) Inventors: Thorsten Gieseke, Bad Oldesloe (DE); Dan Kreuscher, Bad Oldesloe (DE); Georg Baumann, Bad Oldesloe (DE); Matthias Pohl, Bad Oldesloe (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 427 days.

(21) Appl. No.: 18/015,677

(22) PCT Filed: Jul. 7, 2021

(86) PCT No.: PCT/EP2021/068893

§ 371 (c)(1),
(2) Date: Jan. 11, 2023

(87) PCT Pub. No.: WO2022/013041

PCT Pub. Date: Jan. 20, 2022

(65) Prior Publication Data

US 2023/0249016 A1 Aug. 10, 2023

(30) Foreign Application Priority Data

Jul. 15, 2020 (DE) ......................... 102020118735.1

(51) Int. Cl.
*A62C 3/06* (2006.01)
*A62C 35/68* (2006.01)

(52) U.S. Cl.
CPC .............. *A62C 3/065* (2013.01); *A62C 35/68* (2013.01)

(58) Field of Classification Search
CPC ................................ A62C 3/065; A62C 35/68
(Continued)

(56) References Cited

U.S. PATENT DOCUMENTS 1,844,373 A * 2/1932 Urquhart ................ A62C 3/065 169/66
5,636,755 A 6/1997 Guiher

FOREIGN PATENT DOCUMENTS

DE 102008010474 8/2009
EP 2859919 4/2015

OTHER PUBLICATIONS

International Searching Authority, International Search Report with English translation, International Application No. PCT/EP2021/068893, 5 pages; Nov. 2, 2021.

* cited by examiner

*Primary Examiner* — Christopher S Kim
(74) *Attorney, Agent, or Firm* — Perkins Coie LLP

(57) ABSTRACT

A fire protection system for fire protection for liquid hazardous material. The system having at least one storage arrangement for storage of the liquid hazardous material in at least one storage vessel, at least one collecting area, and a first plurality of extinguishing fluid outlets, wherein the at least one storage arrangement is configured to direct the liquid hazardous material into the at least one collecting area in the event of escape of the liquid hazardous material from the at least one storage vessel, and wherein the at least one storage arrangement, the at least one collecting area and the first plurality of extinguishing fluid outlets are arranged relative to one another such that a firefighting action can be executed by a extinguishing fluid for use with a non-hazardous material in case of a fire event of the liquid hazardous material.

11 Claims, 7 Drawing Sheets

(58) Field of Classification Search
USPC .......................................... 169/16, 66, 68, 70
See application file for complete search history.

FIRE PROTECTION SYSTEM FOR FIRE PROTECTION FOR LIQUID HAZARDOUS GOODS AND CORRESPONDING METHOD

PRIORITY CLAIM AND INCORPORATION BY REFERENCE

This application is a 35 U.S.C. § 371 application of International Application No. PCT/EP2021/068893, filed Jul. 7, 2021, which claims the benefit of German Application No. 10 2020 118 735.1, filed Jul. 15, 2020, each of which is incorporated by reference in its entirety.

BACKGROUND OF THE INVENTION

The present invention relates to a fire protection system for fire protection for liquid hazardous material, to a corresponding extinguishing fluid outlet for such a fire protection system, to a fluid-directing element for such a fire protection system and to a method of providing such a fire protection system, and to the use of a non-hazardous material extinguishing fluid.

More specifically, the present invention relates to a fire protection system for fire protection for liquid hazardous material, comprising a storage arrangement for storage of the liquid hazardous material in at least one storage vessel, at least one collecting area and a first plurality of extinguishing fluid outlets for discharge of an extinguishing fluid. A fire protection system in the context of the invention is especially understood to mean a system composed of a storage arrangement, especially a rack arrangement, at least one collecting area and a first plurality of extinguishing fluid outlets, especially sprinklers and/or nozzles. However, the invention is not limited to this specific combination of the fire protection system.

The fire protection system may be disposed in a fire protection area. A fire protection area is understood hereinafter to mean the area which is to be protected by means of the fire protection system. The fire protection area thus corresponds to the area in which a fire protection action is to be performed by the fire protection system.

A fire protection action is understood hereinafter to mean any kind of action that can serve for (preventive) fire protection. Such a fire protection action may especially comprise a firefighting action. A firefighting action in the context of the invention is especially understood to mean the confinement, containment, extinguishment or the like of a fire event. In some embodiments, a firefighting action may also include cooling of the environment. The firefighting action here may be conducted over the whole area, i.e. at several positions in the fire protection area, or in a localized manner, i.e. at a particular position in the fire protection area.

In the present case, the fire protection area especially comprises a storage area in which liquid hazardous material is stored. Liquid hazardous material in the context of the invention is especially understood to mean hazardous liquid substances that are readily flammable or hardly inflammable and/or are readily ignited or difficult to ignite and/or are readily combustible or of low combustibility. In addition, liquid hazardous material in the context of the invention may also be understood to refer to hazardous material that does not comprise any liquid but moves similarly to a liquid, for example a granular material. In addition, liquid hazardous material may also be understood as corresponding to liquefied combustible materials.

In particular, the present invention may be used for fire protection of any kind of hazardous goods. Moreover, even though the following description focuses on liquid hazardous materials, it will be appreciated that non-hazardous goods, especially liquids that are not readily flammable or of low flammability and/or not readily ignited or difficult to ignite and/or not readily combustible or of low combustibility may also be stored in the storage area.

The providing of fire protection measures in storage areas in which liquid hazardous material is stored comes along with particular challenges. Especially in the case of highly combustible liquids, firefighting may be found to be difficult since, in this case, fire incidences may spread rapidly over large areas, i.e., for example, the floor surfaces of the storage areas and/or over the height of the storage arrangement, and may promote great development of heat and further hazards.

In the past, storage areas that serve storage of liquid hazardous material were typically protected by high-expansion foam systems, CO2 extinguishing systems, oxygen reduction systems and/or aerosol systems.

A high-expansion foam system is understood to mean a foam extinguishing system that works on the basis of high-expansion foam. A high-expansion foam system is typically actuated by a central device. If a fire characteristic such as smoke, an extreme temperature rise, sparks, flames or the like is detected, the central device will initiate a fire protection action, especially a firefighting action, that typically leads to triggering of the high-expansion foam system.

Hereby, a high-expansion foam system is based on the displacement effect by means of space flooding: triggering of a high-expansion foam system thus releases foam that has a high foaming rate (according to DIN standard EN 1568-2 typically greater than 200:1) and hence fills the space very quickly with foam, i.e. with air-filled foam bubbles. Complete filling of the space with these foam bubbles then makes it difficult for air or oxygen to be supplied to the fire source. In addition, the foam bubbles can reduce the spread of the fire event by means of damping off thermal radiation. The foam bubble shell consists of a water/foaming agent mixture, which can bring about cooling and wetting of non-burning surfaces.

A disadvantage here of such high-expansion foam systems is that, on account of the principle of function of the complete and full flooding of the fire protection area with foam, there is a danger to life for the personnel within the fire protection area. Therefore, the installation of high-expansion foam systems leads to high construction demands on the existence of emergency exits in order to ensure that all personnel within the fire protection area can leave it within a particular triggering time between the fire event and flooding. A further effect of this in turn is that a high-expansion foam system is not triggered immediately after the recognition of the fire event, but has a certain delay time during which the fire event can spread further.

Further construction demands on the installation of high-expansion foam systems are that there must be sufficient space for the technology required for the generation of the high-expansion foam, and that a fire protection area in which extinguishment with high-expansion foam is intended must have the necessary structural integrity, especially the necessary leak tightness, to enable such firefighting. All of this increases the operating costs of high-expansion foam systems enormously.

A further safety aspect that has to be noted is that it has to be ensured that automatic door and gate closure devices are provided with fire resistance. In general, safety demands on the high-expansion foam system, especially in relation to erroneous triggering, are enormously high.

A further disadvantage is that localized firefighting cannot be performed by means of high-expansion foam systems. Instead, the entire fire protection area has to be flooded in order to lead to successful firefighting. This means that all elements within the fire protection area, including technical devices, machines and the like, that are not even close to the fire event are flooded. Since high-expansion foam often has corrosive properties, this can lead to very high secondary damage both in the technical devices and machines and in the stored material. This means that it is not unusual for the triggering of a high-expansion foam system to lead to high economic damage.

It is even further disadvantageous that the scope of application of high-expansion foam systems is limited. For instance, high-expansion foam systems generally do not enable firefighting in the case of polar liquids. There is also a limit to the size of the storage vessels that can be protected and to the size of the storage vessels for which protection is demonstrable. Moreover, firefighting by means of high-expansion foam in storage arrangements in which the material being stored does not have a fixed container and/or assigned sites—i.e. in the case of chaotic storage—is generally impossible.

A further problem is that high-expansion foam systems, as already mentioned, flood the entire fire protection area to the ceiling. For generation of the amounts of high-expansion foam needed for the purpose, large volumes of air are required, which, in order to improve efficacy, are usually sucked in from the environment of the building having the fire protection area. This means that, in the case of a fire event, a maximum number of openings to the fire protection area must be opened. Since, however, there should be no personnel in the fire protection area in the event of firefighting with high-expansion foam, these openings remain open during flooding. As a result, the high-expansion foam can escape from the fire protection area during the flooding and contaminate the environment.

Lastly, the removal of the high-expansion foam, after triggering of the high-expansion foam system, is very time-consuming and costly, and also laborious, such that the entire fire protection area is not utilizable for a certain period of time even in the case of small fire events.

The term CO2 extinguishing systems refers to those systems that work with carbon dioxide as extinguishing fluid. The way in which CO2 extinguishing systems work is similar to that of high-expansion foam systems: In the case of detection of a fire characteristic, a central device gives a signal which ensures that a fire protection action, especially a firefighting action, is initiated.

In the case of CO2 extinguishing systems too, the initiation of a firefighting action especially leads to flooding of the entire fire protection area, in this case with CO2. This leads to displacement of the oxygen from the fire protection area and hence to suffocation of the fire event.

This means that the use of CO2 extinguishing systems results in similar risk for the personnel within the firefighting area as a (high-expansion) foam system. Therefore, in the case of a CO2 extinguishing system as well, high construction demands are made on emergency exits, doors and gates, triggering times etc., in order to ensure the safety of the personnel within the fire protection area. The costs of maintenance, training of the personnel who are to work within the fire protection area and for the general maintenance of CO2 extinguishing systems are very high, and so CO2 extinguishing systems should be used only in exceptional cases.

A further means of providing a fire protection area in which (liquid) hazardous material is stored involves providing so-called aerosol systems. Aerosol systems are systems that work with an extinguishing fluid consisting of a mixture of very fine particles. Aerosol systems are also used for the complete flooding of the fire protection area with the aerosol. For this purpose, also here a central device is provided, which, in response to the detection of a fire characteristic, triggers a fire protection action, especially a firefighting action. This firefighting action involves flooding the fire protection area. In order to avoid personal injury, in this case as well a certain delay time has to be used between detection of the fire event and firefighting action. Moreover, the use of aerosol systems also entails the provision of a large number of emergency exits, such that all personnel within the fire protection area can escape from the fire protection area within the delay time.

A further disadvantage of aerosol systems is additionally that the aerosols released are very aggressive at surfaces and can additionally lead to corrosion, such that the storage material stored within a fire protection area flooded with an aerosol can be destroyed by the flooding. This can lead to high economic damage in the case of a fire event.

Lastly, fire protection areas in which liquid hazardous material is stored can also be protected by means of an oxygen reduction system. Unlike the above-described systems, however, an oxygen reduction system is not used for control of a fire event, but instead works preventively by the principle of active fire avoidance by reduction of the oxygen level in the fire protection area. Typically, for this purpose, nitrogen is directed into the fire protection area in order to lower the oxygen content within the fire protection area to typically about 14% in the case of liquids and between 5% and 10% for gases.

A disadvantage of this solution is that fire protection areas protected in this way, especially in the case of a very low oxygen content, cannot be entered immediately, but require appropriate equipment. Moreover, the use of an oxygen reduction system leads to constant supply of nitrogen to the fire protection area. This leads to considerable operating costs.

Lastly, the provision of such a system is also very costly. For instance, the buildings that form such fire protection areas must have the necessary leak tightness in order to be able to bring about the reduction of the oxygen level. This again also necessitates automatic door and gate closure devices and is additionally very complex in cases where the stored material frequently has to be transferred inward, outward and/or internally—as is customary in logistics—and is therefore not immediately reconcilable with such applications.

Thus, common to all solutions known from the prior art for protection of a fire protection area in which liquid hazardous material is stored is that they firstly lead to high installation and maintenance costs and secondly require personnel working within the fire protection area on a daily basis to have sufficient training in order to behave appropriately in the case of a fire event. In addition, all solutions known from the prior art work on the basis of a central device that initiates or brings about a fire protection action in response to the detection of a fire characteristic. Moreover, in the case of active firefighting systems, such as the high-expansion foam system, the CO2 system and/or the aerosol system, it has to be assumed that firefighting will be delayed since it is necessary here first to wait for a certain period of time before personnel within the fire protection area have reached safety. Lastly, all solutions known from the prior art are based on the principle that the whole fire protection area should be protected. Localized firefighting in the case of a localized fire is thus impossible with the known prior art solutions.

SUMMARY OF THE INVENTION

Against this background, it is an object of the present invention to create a solution that does not have the above disadvantages. In particular, it is an object of the invention to provide a solution that enables efficient and immediate firefighting. It is a further object of the invention to provide a solution that enables inexpensive and uncomplicated maintenance and reduces the need for intensive training of personnel within the fire protection area.

This object is achieved in accordance with the invention in that the at least one storage arrangement is configured, in the event of escape of the liquid hazardous material from the at least one storage vessel, to direct the liquid hazardous material into the at least one collecting area, wherein the at least one storage arrangement, the at least one collecting area and the first plurality of extinguishing fluid outlets are arranged relative to one another such that the first plurality of extinguishing fluid outlets is configured to discharge the extinguishing fluid into the at least one collecting area in case of a fire event of the liquid hazardous material.

An extinguishing fluid is understood hereinafter to mean any kind of extinguishing fluid that can serve for firefighting. Such an extinguishing fluid may especially comprise an extinguishing fluid liquid, a foam, a gas, an aerosol and/or a mixture of these. In some embodiments, such an extinguishing fluid especially comprises an extinguishing fluid which typically cannot be used alone—i.e. can be used only in combination with another extinguishing fluid—for extinguishing hazardous material, especially liquid hazardous material, which typically cannot be used as the exclusive extinguishing fluid for extinguishment of liquid hazardous material. Such an extinguishing fluid can also be referred to hereinafter as non-hazardous material extinguishing fluid.

In some embodiments, the invention especially relates to an extinguishing fluid which comprises water ($H_2O$) or consists of water. In some embodiments, the invention relates to an extinguishing fluid comprising or consisting of a foam, such as a low-, medium- or high-expansion foam, and/or a water/foaming agent mixture. In some embodiments, the foam and/or the water/foaming agent mixture may especially be configured for a foaming rate greater than 0, especially greater than 0.5, especially greater than 1.0, even more especially greater than 1.5. A foaming rate is understood here to refer to the ratio, especially the quotient, between the volume of a finished foam and the volume of the original fluid/foaming agent mixture, especially the water/foaming agent mixture. The foaming rate may especially be dependent on the properties of the foam jet pipe used and/or the extinguishing fluid outlet used, such as a sprinkler or nozzle.

In some embodiments, it is even more particularly envisaged that the extinguishing fluid is a low-expansion foam or that the extinguishing fluid comprises a low-expansion foam. A low-expansion foam may especially be understood to mean a foam having a foaming rate in the lower double-digit to single-digit range, especially of below 20. Low-expansion foam is relatively wet and thus of particularly good suitability for achieving precise and large throwing distances and hence for being able to fight the fire event in a localized manner and at a large distance. In contrast to high-expansion foam, the extinguishing effect of low-expansion foam is not based on suffocation by means of displacement, but consists in cooling of the burning material by the low-expansion foam and the exertion of a separation effect. Low-expansion foam is typically used for firefighting on solids and/or liquids of fire classes A and B. The fire protection system of the invention thus also enables the use of low-expansion foam for firefighting of liquid hazardous material.

However, it will be appreciated that the fire protection system of the invention is not limited to low-expansion foam as foam for extinguishing, but also enables performance of firefighting by means of high- or medium-expansion foam.

This is enabled in that the storage arrangement in which the liquid hazardous material is stored in corresponding storage vessels is configured such that, in the event of damage, i.e. in the case that liquid hazardous material leaks from a storage vessel, this liquid hazardous material is directed, by means of the geometry of the storage arrangement, in the direction of a collecting area and collected there.

The fire protection system also has a number of extinguishing fluid outlets, especially sprinklers, that are configured to discharge an extinguishing fluid in the direction of the collecting area. For this purpose, the extinguishing fluid outlets especially have a first defined directional characteristic for the extinguishing fluid. The extinguishing fluid outlets are thus configured such that they discharge the extinguishing fluid in a first defined direction. This first defined direction in which the extinguishing fluid can be discharged is preferably known, such that the direction in which the extinguishing fluid is discharged through the extinguishing fluid outlet can be fixed by the positioning and alignment of the extinguishing fluid outlet.

According to the invention, the storage arrangement, the collecting area and the extinguishing fluid outlets are arranged relative to one another such that the storage arrangement directs the liquid hazardous material that has leaked from the storage vessel into the collecting area, wherein the extinguishing fluid outlets are arranged and aligned likewise to release the extinguishing fluid in the direction of the collecting area.

A storage arrangement in the present context is especially understood as referring to an arrangement in which storage material, especially liquid hazardous material, can be stored in corresponding storage vessels. A storage arrangement here may especially comprise one or more rack arrangements in which the storage material can be stored. The storage arrangement preferably comprises a plurality of storage surfaces on which the storage material can be positioned as well as a plurality of adjusting elements, for example rack uprights, which serve to stabilize the storage arrangement.

The storage surfaces are preferably configured such that, if liquid hazardous material should leak from a storage vessel stored thereon, the storage surfaces have corresponding fluid-directing devices, such as fluid-directing surfaces or fluid-directing channels, which direct the liquid hazardous material in the direction of the collecting area. In this case, the storage vessels are preferably aligned with their outlets in the direction of the collecting area.

A storage vessel may particularly refer to a vessel or container for storage of liquid hazardous material. Hereby, the storage vessel has a storage volume that may be filled completely or only partly. A storage vessel refers to, for example, an Intermediate Bulk Container (IBC) having a capacity of up to 1000 liters. Such IBCs here are preferably stored only in the lower areas of the storage arrangement. Alternatively or additionally, a storage vessel may also refer to a canister or a drum, for example of plastic or metal. Such a canister or drum may preferably have a capacity of up to 220 liters. Canisters and/or drums may be stored here in all areas of the storage arrangement.

A collecting area may particular refer to any area in which the liquid hazardous material that has leaked from the storage vessel can be contained and collected. Hereby, the dimensions of the collecting area are preferably such that it can accommodate at least the contents of one complete storage vessel. The dimensions of the collecting area are thus such that, in the event of leaking of the liquid hazardous material from a storage vessel, it can fully accommodate the escaped liquid hazardous material. For this purpose, the collecting area may be implemented as a single collecting area. Alternatively or additionally, the collecting area may also be implemented, however, by one or more collecting subareas, the dimensions of which are collectively such that they can fully accommodate the liquid hazardous material in the event of an escape.

The collecting area may preferably be in a horizontally offset arrangement from the storage vessels. In some embodiments, the collecting area may especially be disposed in the gap utilized for loading and/or unloading the storage arrangement between two adjacent storage arrangements, such as racks. This has the advantage that the collecting area can function as collecting area for both storage arrangements on both sides and for all levels of the storage arrangements. Since the gap is present in any case, the space required for the collecting area is thus kept low.

In some embodiments, the collecting area may thus, for example, be formed by a floor area, especially in the gap. Alternatively or additionally, however, it may also be formed by corresponding collecting arrangements, such as collecting tanks, within a rack compartment.

A fire protection system of the invention typically has multiple storage arrangements that are provided spaced apart at a distance from one another. In this case, the collecting area may be formed within the area between any two storage arrangements. Alternatively or additionally, the collecting area may also be formed between a storage arrangement and a second separating element, for example a wall.

The collecting area is preferably in a fluid-tight setup, such that the liquid hazardous material collected therein cannot leave the collecting area. For this purpose, the collecting area may especially be bounded by appropriate fluid barriers, such that the liquid hazardous material can be collected in a localized manner at one position.

The fire protection system of the invention also has a first plurality of extinguishing fluid outlets. The first plurality of extinguishing fluid outlets here may preferably have a first plurality of sprinklers and/or consist of said first plurality of sprinklers.

A sprinkler is understood here especially to mean a sprinkler head. Such sprinkler heads are supplied with an extinguishing fluid by a fluid supply, typically a sprinkler system. In the normal state, the sprinklers are closed with a temperature-sensitive element, such as a liquid-filled glass ampoule. In the event of fire, the liquid within the glass ampoule warms up and expands. The ampoule bursts, as a result of which the sprinkler opens and the extinguishing fluid can escape. The advantage of the configuration of the extinguishing fluid outlets as sprinklers is thus that sprinklers react directly to changes in temperature resulting from local fire events and are triggered without the need for a central device, with the ability to limit the triggering to the sprinklers within an area immediately around the (localized) fire event.

The invention thus provides a fire protection system that does not need a central device and by means of which a fire event in a storage area for liquid hazardous material can be fought in a localized and direct manner. This is achieved in particular through having the at least one storage arrangement, the at least one collecting area and the first plurality of extinguishing fluid outlets arranged relative to one another such that the lost liquid hazardous material and the extinguishing fluid can be directed to the same position within the collecting area. This can achieve efficient and rapid firefighting.

The invention is thus based on the finding that the number of extinguishing fluids usable for fire protection of liquid hazardous material can be increased by aligning the storage arrangement in which the liquid hazardous material is stored, the corresponding collecting area and the first plurality of extinguishing fluid outlets relative to one another in such a way that the liquid hazardous material, in the event of damage, is collected in the collecting area and then extinguished by the extinguishing fluid, for example pure water and/or a low-expansion or medium-expansion foam and/or a mixture thereof, exiting from the first plurality of extinguishing fluid outlets. In other words, the alignment of the storage arrangement, the collecting area and the first plurality of extinguishing fluid outlets brings about localization of the extinguishing fluid that now enables usage of extinguishing fluids that before could not be used for liquid hazardous materials, for example water and/or extinguishing fluids that do not have to be used in a space-filling manner, for such liquid hazardous materials.

The fire protection system of the invention thus no longer has the disadvantages of solutions known to date: The fire protection system of the invention works on the basis of localized firefighting, no flooding of the room is envisaged. As a result, there is no need to provide evacuation times for persons within the fire protection area, firefighting can be initiated immediately. In addition, it is possible, by the solution of the invention, to avoid damage to the stored material. In addition, after firefighting, the remaining area within the fire protection area in which no fire event has occurred can be utilized again immediately.

A further advantage over known sprinkler systems on the other hand is that the solution of the invention also enables use of sprinkler-based fire protection solutions for liquid hazardous material and/or larger storage vessels. Additionally enabled is not just the provision of larger storage vessels but also a placing thereof in higher positions. This is possible, since the alignment of the extinguishing fluid outlets means that they can also reach the higher positions, and the directing of the liquid hazardous material into lower-lying areas ensures that firefighting is effected in the lower-lying area, and not just high up in the rack. This can increase the storage height for liquid hazardous material in the storage arrangement.

In addition, the use of a sprinkler system working with an extinguishing fluid such as water and/or low-expansion and/or medium-expansion foam and/or a water/foaming agent mixture, for example, can reduce both installation costs and capital costs since the high construction demands on emergency exits and/or automatic door and gate closing devices can be reduced in complexity. For instance, it may be the case that no automatic door and gate closing devices are needed any more and/or the number of emergency exits can be reduced. In addition, it is possible to reduce the number of necessary maintenance operations (on the central device, the generators, etc.).

In some embodiments, the first plurality of extinguishing fluid outlets may be configured to discharge the extinguishing fluid with a first defined directional characteristic that brings about discharge of the extinguishing fluid in the direction of the collecting area.

In some embodiments, extinguishing fluid outlets configured to release extinguishing fluid into the collecting area may especially be disposed on the storage arrangement, preferably on the adjusting elements of the storage arrangement, especially the rack uprights of a rack arrangement. Alternatively or additionally, an arrangement of the first plurality of extinguishing fluid outlets on the storage arrangement may also be accomplished by means of a mount provided specially for the purpose. The mount here may be provided separately from the adjusting elements of the storage arrangement.

This arrangement on the storage arrangement makes it possible to dispose the extinguishing fluid outlets close to the collecting area, in order to enable even better localization of firefighting by means of the extinguishing fluid. In addition, the arrangement enables very precise alignment of the extinguishing fluid outlets in a way that leads to precisely directed discharge of the extinguishing fluid.

It will be appreciated that the provision of a directional characteristic does not mean that all extinguishing fluid outlets provide a particular directional characteristic for the extinguishing fluid. In some embodiments, it is also possible for just a single extinguishing fluid outlet to be configured with a particular directional characteristic for the extinguishing fluid, in which case the interaction of this extinguishing fluid outlet with the further extinguishing fluid outlets ensures that the extinguishing fluid is discharged with the first defined directional characteristic overall.

A first defined directional characteristic is understood hereinafter to mean that the extinguishing fluid outlets are configured to discharge the extinguishing fluid in a particular direction. In some embodiments, the extinguishing fluid outlets, for this purpose, may have a directional characteristic for the extinguishing fluid, such that the extinguishing fluid is particularly not discharged with a 360° characteristic, i.e. the directional characteristic is less than 360°.

In this case, the first defined directional characteristic may preferably be configured such that the extinguishing fluid is discharged in the direction of the collecting area in order to be able to cover the liquid hazardous material collected there locally with extinguishing fluid in the case of the fire event and hence to fight the fire event in a localized manner. Hereby, the directional characteristic may preferably be generated by an appropriately aligned spray plate element. It is possible here to arrange the plurality of extinguishing fluid outlets such that the plurality of extinguishing fluid outlets, on account of their respective directional characteristic, can distribute the extinguishing fluid over the entire area of the collecting area in a directed manner. By means of this interplay, it is not necessary that a single extinguishing fluid outlet covers the entire collecting area, instead, the plurality of extinguishing fluid outlets may be configured to collectively cover the entire collecting area.

In some embodiments, the at least one storage arrangement comprises at least one fluid-tight elevation which is configured, in the event of leaking of the liquid hazardous material from the at least one storage vessel, to direct the liquid hazardous material into the at least one collecting area. Preferably, the at least one fluid-tight elevation has at least one oblique surface which declines in the direction of the at least one collecting area, in order to direct the liquid hazardous material into the at least one collecting area in the event of escape of the liquid hazardous material from the at least one storage vessel.

It is preferable that the liquid hazardous material still present in the storage vessels, i.e. that the liquid hazardous material which has not leaked from the storage vessel, does not come into contact with the collecting area. For this purpose, the storage arrangement, in some embodiments, may have an elevation, for example a pedestal. The elevation may especially be configured to direct the liquid hazardous material in the direction of the collecting area, for example by means of corresponding fluid-directing surfaces or the like. The elevation is preferably manufactured from a fluid-tight material. In some embodiments, the elevation is especially configured in the form of a concrete pedestal.

In some embodiments, the fluid-tight elevation may especially be configured such that it has an oblique surface which declines in the direction of the base surface. The oblique surface may especially be implemented as a positioning surface for the storage vessel. If the liquid hazardous material then leaks from one of the storage vessels, the liquid hazardous material is directed over the oblique surface in the direction of the collecting area. It is possible here for the oblique surface to be tapered such that it concludes with the collecting area, or it may be tapered such that it ends somewhat above the base surface and hence above the collecting area.

Alternatively, the fluid-tight elevation may also be configured such that it has a straight surface, i.e. a surface that runs parallel to the base surface, and an oblique surface which declines from the straight surface on the top side of the fluid-tight elevation in the direction of the base surface. The straight and oblique surfaces may merge into one another here and/or be connected to one another via a fluid-tight connection. In this embodiment, the straight surface here may especially be used as a positioning surface for the storage vessels, while the oblique surface serves as a fluid-directing surface that conducts the fluid, proceeding from the positioning surface of the storage vessels, in the direction of the collecting area.

In some embodiments, the storage arrangement has at least one fluid barrier element which is connected—preferably in a fluid-tight manner—to the at least one fluid-tight elevation and is configured to prevent spreading of the liquid hazardous material into an area outside the at least one collecting area in the event of escape of the liquid hazardous material from the at least one storage vessel.

In some embodiments, the storage arrangement may further include one or more fluid barrier elements that are preferably disposed at the edges of the fluid-tight elevation and are in fluid-tight connection to the area of the fluid-tight elevation. These fluid barrier elements may preferably be executed as elements that extend vertically with respect to the surface of the fluid-tight elevation. As a result, it is not possible for liquid hazardous material present on the surface to escape to the sides of the fluid-tight elevation and to the reverse side of the fluid-tight elevation. Instead, all the liquid hazardous material can be directed via the oblique surface in the direction of the collecting area.

In this way, it is possible to collect the liquid hazardous material in a localized manner within the collecting area and store it there for firefighting.

In some embodiments, the at least one storage arrangement comprises at least one fluid-directing element which is configured to direct the liquid hazardous material into the at least one collecting area in the event of escape of the liquid hazardous material from the at least one storage vessel. In some embodiments, the at least one fluid-directing element may have a base area and at least one oblique fluid-directing surface connected thereto, in which case the fluid-directing element is arranged such that the at least one oblique fluid-directing surface declines in a fluid-directing direction of the at least one collecting area, in order to direct the liquid hazardous material into the at least one collecting area in the event that it escapes from the at least one storage vessel.

It is preferable that the storage arrangement comprises multiple levels. In the case of the lowermost level, the storage vessels may stand directly on the fluid-tight elevation. In the event of damage, it is then possible for the liquid hazardous material to be directed from the storage vessel into the collecting area via the oblique surface of the fluid-tight elevation. In some embodiments, this oblique surface may also be provided by disposing a fluid-directing element on the fluid-tight elevation.

In the further levels of the storage arrangement, efficient fluid direction can be enabled in that the storage arrangement likewise comprises one or more fluid-directing elements that are provided for directing the liquid hazardous material in the event of escape from the storage vessel. For this purpose, the fluid-directing elements may preferably be disposed in each level beneath the storage vessel. The fluid-directing elements may hereby be configured as separate fluid-directing elements that are insertable in a releasable manner in the storage arrangement. Alternatively or additionally, the fluid-directing elements may also be configured as part of the storage arrangement. For example, a rack arrangement may be configured with rack levels that are executed as fluid-directing elements.

In some embodiments, the fluid-directing elements may especially be configured such that they have an oblique surface that declines in the direction of the base surface. The oblique surface may especially be implemented as a positioning surface for the storage vessels in the higher levels. When the liquid hazardous material then leaks from one of the storage vessels, the liquid hazardous material, analogously to the fluid-tight elevation, may be directed over the oblique surface in the direction of the collecting area. In some embodiments, the fluid-directing elements may also be configured such that they have a straight surface that runs parallel to the base surface, and an oblique surface that declines from the straight surface on the top side of the fluid-tight elevation in the direction of the base surface. The straight and oblique surfaces here may merge into one another and/or be connected to one another via a fluid-tight connection. In this embodiment, the straight surface here may especially be used as a positioning surface for the storage vessels in the higher planes, while the oblique surface serves as a fluid-directing surface that likewise leads the fluid in the direction of the collecting area proceeding from the positioning surface of the storage vessels.

In some embodiments, the fluid-directing elements may be configured in the form of fluid-tight metal sheets which are disposed beneath the storage vessel and are insertable into the storage arrangement. These metal sheets may, as described above, be configured entirely as oblique surfaces or have a straight surface connected to an oblique surface.

In the event of leaking of the liquid hazardous material, it reaches the respective fluid-directing element. The fluid-directing element may then be configured, for example by means of corresponding grooves or similar fluid conduits, to direct the escaped liquid hazardous material away from the storage arrangement in the direction of the collecting area. It is especially possible here for the fluid-directing elements to be configured such that they prevent escaped liquid hazardous material from getting close to any other storage vessel disposed alongside or beneath the damaged storage vessel.

In some embodiments, each storage vessel has at least one dedicated fluid-directing element. In some embodiments, especially in embodiments in which storage vessels do not exceed a certain size, a fluid-directing element may, however, also be assigned to multiple storage vessels. If the fluid-directing elements are configured in the form of fluid-tight metal sheets, it is possible, for example, for one fluid-tight metal sheet to be disposed beneath a pallet having multiple, relatively small storage vessels. This means that, in some embodiments, the fluid-directing elements may be provided not for each storage vessel but for each pallet.

The use of such fluid-directing elements can prevent spread of the liquid hazardous material—and hence also of fire—along the storage arrangement.

In some embodiments, it is preferable that the fluid-directing element may be disposed beneath a storage vessel in the storage arrangement. For this purpose, it is especially preferable that the fluid-directing element, similarly to the fluid-tight elevation, has a straight surface which can effectively serve as a positioning surface for the storage vessel disposed on the fluid-directing element—and/or the corresponding pallet. This straight surface may then form the base surface of the fluid-directing element. The fluid-directing element may also be configured to direct a liquid hazardous material that has leaked from a storage vessel in the direction of the collecting area. In some embodiments, the fluid-directing element, for this purpose, may have an oblique fluid-directing surface connected in a fluid-tight manner to the base surface of the fluid-directing element. The oblique fluid-directing surface is hereby preferably configured to direct the liquid hazardous material present on the base surface away from the base surface in the direction of the collecting area. For this purpose, the oblique fluid-directing surface may decline in the fluid-directing direction of the at least one collecting area. As a result, the liquid hazardous material flows from the base surface onto the fluid-directing surface in the collecting area.

For this purpose, the fluid-directing element comprising the base surface and the fluid-directing surface may preferably be arranged in the storage arrangement such that the fluid-directing surface is disposed on the side of the storage arrangement on which the collecting area is formed.

In this way, the liquid hazardous material, after exiting from a storage vessel, may also be directed reliably into the collecting area from higher levels of the storage arrangement.

In some embodiments, the at least one fluid-directing element also has at least one lateral surface, in which case the at least one lateral surface is configured to prevent spreading of the liquid hazardous material into an area outside the at least one collecting area in the event of leaking of the liquid hazardous material from the at least one storage vessel.

It is preferable that the liquid hazardous material, after leaking from the storage vessel, does not spread beyond the storage area. For this purpose, it is envisioned that the liquid hazardous material is collected in the collecting area. In order to prevent the liquid hazardous material that has leaked from the storage vessel from flowing from the storage arrangement into regions other than the collecting area, the fluid-directing elements may preferably have one or more lateral surfaces that extend vertically upward proceeding from the positioning surface of the storage vessel in the storage arrangement, especially the base surface of the fluid-directing element, i.e. typically in the direction of the roof arrangement, and hence prevent the liquid hazardous material from spreading into an area outside the at least one collecting area.

The at least one lateral surface of the fluid-directing element may hereby particularly be implemented as a first lateral surface which, when viewed from the fluid-directing surface, is disposed on the right-hand side of the base surface of the fluid-directing element. Alternatively or additionally, the at least one lateral surface may be implemented as a second lateral surface which, when viewed from the fluid-directing surface, is disposed on the left-hand side of the base surface of the fluid-directing element. Alternatively or additionally, the lateral surface may also be implemented as a reverse-side surface which, viewed from the fluid-directing surface, is disposed on the opposite side of the base surface.

Hereby, the fluid-directing elements thus configured may preferably interact with one another in order to provide fluid conduction in the direction of the collecting area and a fluid barrier in all other areas for a whole series of storage arrangements. For this purpose, the fluid-directing elements may preferably be equipped with appropriate connecting elements that are configured to provide a fluid-tight connection between a first fluid-directing element and a second fluid-directing element. The connecting elements are preferably disposed here on the sides on which, when viewed from the fluid-directing surface, no lateral surfaces are formed. The connecting elements may especially be implemented as overlap elements with and/or without soft-sealing gasket elements that may be overlapped with one another in order thus to establish the fluid-tight connection.

This configuration can provide a variable fluid-directing arrangement which enables reliable directing of the liquid hazardous material that has escaped from the storage vessels solely into the collecting area and prevention of spreading of the escaped liquid hazardous material into other areas. In particular, the use of fluid-directing elements that can be connected to one another enables provision of storage arrangements of variable size with a fluid-directing arrangement at higher levels of the storage arrangements.

Depending on the storage design—for example three-position storage, in which three storage vessels and/or three pallets with storage vessels disposed thereon are disposed between two positioning elements per level, or two-position storage, in which two storage vessels and/or two pallets with storage vessels disposed thereon are disposed between two positioning elements per level—this enables adjusted fluid-directing arrangements consisting either of two or three fluid-directing elements.

In some embodiments the at least one collecting area has a plurality of fluid receptacles configured to receive the liquid hazardous material directed into the collecting area. In some embodiments, the plurality of fluid receptacles is configured to fully accommodate the liquid hazardous material in the event of escape of the liquid hazardous material from the at least one storage vessel.

It is further preferable that the liquid hazardous material is collected in the collecting area such that it does not spread over a large area and especially does not have a particularly large surface area. This is the case because, in case of a fire event of the liquid hazardous material, i.e. in the case of a fire event, rapid and localized firefighting, especially extinguishing, is possible especially when the area of the fire event is at a minimum.

In order to accomplish this, the collecting area may preferably be equipped with a plurality of fluid receptacles configured to receive the liquid hazardous material directed into the collecting area. For this purpose, any of the fluid receptacles may preferably be implemented as a kind of channel within the collecting area. For this purpose, the fluid receptacles may be configured as bays into the base area.

The dimensions and number of fluid receptacles may preferably be matched to one another such that the fluid receptacles can accommodate at least the contents of one storage vessel. It is possible here for the fluid receptacles especially to be assigned to a particular number of storage vessels, for example all storage vessels disposed within a storage arrangement. In some embodiments, all storage vessels of the two storage arrangements that form the collecting area may be assigned to the fluid receptacles within the respective collecting area. If, in this case, liquid hazardous material escapes from one of the storage vessels, it is possible to choose the dimensions and number of fluid receptacles such that the entire contents, i.e. the entire liquid hazardous material, can be accommodated by the fluid receptacles. In other embodiments, it is also possible for only a portion of all the storage vessels of a rack arrangement to be assigned to a particular number of fluid receptacles. In this case, each of the portions of storage vessels thus ascertained may be associated with a particular number of fluid receptacles. If liquid hazardous material then escapes from a storage vessel in a particular portion, the fluid receptacles assigned to that portion, in terms of their number and dimensions, must be capable of accommodating the liquid hazardous material. If, by contrast, liquid hazardous material leaks from a storage vessel in another portion, the fluid receptacles assigned to that other portion, in terms of their number and dimensions, must be capable of accommodating the liquid hazardous material. In some embodiments, the fluid receptacles, in terms of their number and dimensions, may especially be configured always to accommodate the contents of the largest storage vessel assigned thereto.

The width of the fluid receptacles may be chosen so as to approximately correspond to the width of the collecting area, while the length and depth of the fluid receptacles may preferably be chosen such that the receiving volume of the fluid receptacle meets the demands that arise from the amount of contents that has to be accommodated and the number of fluid receptacles assigned to a particular amount of storage vessels.

In some embodiments, the length of the fluid receptacle may be between 200 mm and 500 mm, preferably 200 mm to 400 mm, even further preferably between 200 mm and 300 mm. In order to enable travel over the collecting area comprising the fluid receptacles in the case of large lengths, the fluid receptacles may be equipped with fluid-permeable covers, for example grids. In this way, it is possible to ensure access to the storage arrangement even from the side of the collecting area and especially filling and/or clearing thereof.

In these cases, the ultimate accommodation volume can be determined via the depth of the fluid receptacle, i.e. the depth of the channel that forms the fluid receptacle. The depth may preferably be chosen such that, given a particular number of fluid receptacles, this number of fluid receptacles is capable of fully accommodating at least the contents of a storage vessel. In this way, it is possible to ensure that the liquid hazardous material accounts for only a small surface area within the collecting area—and hence the storage area. In the case of a fire event, this low surface area may then be extinguished specifically by means of discharge of extinguishing fluid from the extinguishing fluid outlets onto the fluid receptacles.

This arrangement thus prevents spread of liquid hazardous material over large areas and hence spread of the fire event. In this way, it is possible to reduce secondary damage. Moreover, this arrangement enables localized and efficient extinguishment at the site of the fire event, which means that other regions of the storage area still remain utilizable.

In some embodiments, the at least one collecting area may have a length corresponding to an extension length of the at least one fluid-tight elevation. At a first end and a second end of the length of the collecting area at least one respective fluid barrier element may be disposed which is configured to prevent spreading of the liquid hazardous material into an area outside the at least one collecting area in the event of leaking of the liquid hazardous material from the at least one storage vessel.

For efficient and localized firefighting, it is necessary to prevent the spread of the liquid hazardous material over wide areas of the storage area. For this purpose, a collecting area is provided, which may optionally comprise a number of fluid receptacles. In order to prevent the liquid hazardous material from flowing away into other regions of the storage area after having been directed into the collecting area via the sides of the collecting area—for example prior to the liquid hazardous material having been accommodated by the one or more fluid receptacles—the collecting area may also be equipped with a fluid barrier element at its first end and at its second end which is configured to prevent the liquid hazardous material from spreading over an area outside the collecting area.

The fluid barrier elements may hereby be connected to the collecting area, especially in a fluid-tight manner, and extend vertically upward from the collecting area, i.e. typically in the direction of the roof arrangement. Alternatively, the fluid barrier elements may also extend obliquely upward, i.e. at an angle relative to the base area outside the collecting area. This angle may particularly be greater than 30°, even more especially greater than 45°, even more particularly greater than 60°. In some embodiments, the fluid barrier elements are in a very flat alignment relative to the base area, and may thus, for example, assume any value between 5° and 20°, especially between 5° and 15°, even more especially between 5° and 10°. This makes it possible to travel over the fluid barrier elements even by means of a transport device for inward, outward and internal transfer. For this purpose, the fluid barrier elements may also have a height of between 5 mm and 10 cm, especially 5 mm to not more than 5 cm, preferably of 20 mm.

As mentioned above, the extinguishing fluid outlets may preferably be disposed on the storage arrangement. In some embodiments in which the collecting area comprises a plurality of fluid receptacles, the extinguishing fluid outlets may especially be disposed on the storage arrangement such that the extinguishing fluid outlets are disposed exactly above these fluid receptacles. In this case, it is possible for a corresponding extinguishing fluid outlet to be disposed on each storage arrangement—i.e. typically on the two storage arrangements of which the elevations form the collecting area. Alternatively, however, a corresponding extinguishing fluid outlet may also be disposed only above a portion of the fluid receptacles, for example above every second, third, fourth, fifth, sixth, seventh, eighth, ninth, tenth etc. fluid receptacle in each storage arrangement.

In this way, particularly if the extinguishing fluid outlets are sprinklers, it is possible to, firstly, achieve faster triggering of firefighting, i.e. faster discharge of the extinguishing fluid from the extinguishing fluid outlets. This is the case because the arrangement above the fluid receptacles means that the rise in temperature takes place directly below the extinguishing fluid outlets, in particular sprinklers, such that the ampoules thereof and/or other triggering elements are triggered more quickly. Secondly, even better alignment of the extinguishing fluid onto the fire event can be achieved.

In some embodiments, the first plurality of extinguishing fluid outlets may comprise a first subgroup, wherein the first subgroup in each case comprises at least two paired extinguishing fluid outlets that are particularly disposed as a unit in block form on the at least one storage arrangement, wherein the at least two paired extinguishing fluid outlets are aligned at a defined angle relative to one another. In some embodiments, the defined angle is not less than 30°, particularly not less than 60°, even more particularly not less than 90°, particularly not less than 120°, particularly not less than 180°.

In some embodiments, at least a portion of the first plurality of extinguishing fluid outlets may be provided in the form of a unit in block form. The extinguishing fluid outlets that are part of the unit in block form are preferably configured to discharge the extinguishing fluid with a first defined directional characteristic. For this purpose, the extinguishing fluid outlets may also be disposed in the unit in block form such that they are at a defined angle to one another, i.e. the central axes of the extinguishing fluid outlets are at a particular angle to one another. In some embodiments, this angle may be not less than 30°. In some embodiments, this angle may be not less than 60°, preferably not less than 90°. In some embodiments, the angle may be not less than 120°.

In some embodiments, the angle may be not less than 180°. In these embodiments, it is preferable that the extinguishing fluid outlets are provided with a deflector configured to deflect the exiting extinguishing fluid such that it is discharged in the direction of the collecting area.

This arrangement of the first plurality of extinguishing fluid outlets in a unit in block form can enable easier installation of the extinguishing fluid outlets, for example on the storage arrangement. The extinguishing fluid outlets may especially be aligned relative to one another such that they, upon installation, release the extinguishing fluid in just such a directed manner that it is discharged towards a particular defined point. In some embodiments, the alignment may be effected such that the extinguishing fluid can be discharged in the direction of the collecting area in order to enable very substantially complete and uniform coverage of the area of the collecting area with extinguishing fluid. In some embodiments, the alignment may especially be effected such that the extinguishing fluid can be discharged in a directed manner in the direction of the fluid receptacles. Further types of alignment are conceivable. A particularly advantageous effect is achieved here when the first plurality of extinguishing fluid outlets are arranged in the form of a unit in block form has the first defined directional characteristic. In this case, the extinguishing fluid discharge direction may be defined even better.

The arrangement of extinguishing fluid outlets thus chosen in the unit in block form enables use of commercial extinguishing fluid outlets such as sprinklers and nozzles. There is no need to develop new extinguishing fluid outlets for provision of the desired directional characteristic.

A further advantage of the use of the unit in block form is that the extinguishing fluid outlets, on account of their arrangement within the unit in block form, give better protection against external mechanical effects, especially against damage in the course of loading and/or transfer and/or unloading.

In some embodiments, the fire protection system may further comprise a second plurality of extinguishing fluid outlets configured to discharge the extinguishing fluid with a second defined directional characteristic.

In some embodiments, the fire protection system may further comprise a second plurality of extinguishing fluid outlets configured to discharge extinguishing fluid with a second defined directional characteristic different from the first. The second plurality of extinguishing fluid outlets may preferably also comprise one or more sprinklers that work in a known manner. The extinguishing fluid discharged through the second plurality of extinguishing fluid outlets may preferably have a different second directional characteristic than the directional characteristic of the extinguishing fluid discharged from the first plurality of extinguishing fluid outlets. In some embodiments in which the extinguishing fluid outlets are configured as sprinklers or comprise sprinklers, the directional characteristic of the extinguishing fluid may preferably be brought about by a directing element such as a sprinkler plate element. In some embodiments, the second directional characteristic of the extinguishing fluid is such that the extinguishing fluid is discharged with a 360° characteristic, i.e. uniformly in all directions. However, the second directional characteristic may also be a different directional characteristic. In some embodiments, the second plurality of extinguishing fluid outlets is disposed on a roof arrangement of a fire protection area and/or on the at least one storage arrangement, in order to discharge the extinguishing fluid in the direction of the storage arrangement.

In some embodiments, the second plurality of extinguishing fluid outlets may be disposed on a roof arrangement of a fire protection area, especially of the storage area protected by the fire protection system. Since the second number of extinguishing fluid outlets can discharge the extinguishing fluid preferably over a wide range, the extinguishing fluid outlets disposed on the roof arrangement can pass additional extinguishing fluid both into the collecting area and the fluid receptacles and into the storage arrangement, and hence can fight any fire event within the storage arrangement and/or within the collecting area. Especially within the collecting area, this arrangement assists the extinguishing fluid outlets of the first plurality of extinguishing fluid outlets.

It should be noted once again here that the fire protection system of the invention is not limited to comprising only the first and second plurality of the extinguishing fluid outlets. The fire protection system of the invention may thus also comprise further extinguishing fluid outlets. In some embodiments, the fire protection system of the invention may be provided in addition to a commercial fire protection system having corresponding roof sprinklers, i.e. may also comprise this roof sprinkler.

Alternatively or additionally, the second plurality of extinguishing fluid outlets may also be disposed on the storage arrangement, especially at a top end of each storage level of the storage arrangement. These extinguishing fluid outlets may particularly additionally supply the storage vessels within the storage arrangement with extinguishing fluid in order thus to be able to fight any fire events within the storage arrangement, especially around the storage vessels. In some embodiments, at least one of the first or second plurality of extinguishing fluid outlets may comprise a second subgroup, in which case the second subgroup comprises extinguishing fluid outlets that are arranged individually on the at least one storage arrangement such that the defined directional characteristic results in discharge of the extinguishing fluid in the direction of the at least one storage arrangement, especially the storage vessel.

Alternatively or additionally to the above-described embodiment, it is also possible for extinguishing fluid outlets of the first plurality to be disposed directly on the storage arrangement, especially on the top sides of each storage level. These extinguishing fluid outlets of the first plurality belong to a further subgroup which is disposed directly on the storage arrangement, not via a unit in block form. By virtue of the first directional characteristic, which has the effect that the extinguishing fluid is discharged primarily in a two-dimensional manner with a particular width in a particular direction, it is possible via the arrangement of the extinguishing fluid outlets of the further subgroup of the first plurality to achieve the effect that especially the storage vessels within the storage arrangement are additionally wetted with extinguishing fluid, such that any fire events within the storage arrangement can be fought.

The particular advantage of this embodiment may be that the predetermined first directional characteristic ensures that the alignment of the extinguishing fluid outlets allows the extinguishing fluid to be discharged preferentially in a particular direction. This definition of direction makes it possible to use fewer extinguishing fluid outlets in order to supply the same number of storage vessels as by means of the extinguishing fluid outlets of the second plurality, which have a second, less specific, especially 360°, directional characteristic.

In some embodiments, the extinguishing fluid comprises a foam, especially a fluorine-containing and/or fluorine-free foam.

The extinguishing fluid used in the fire protection system may preferably comprise a foam, especially a fluorine-free foam, for example Moussol and/or Vapurex. In other embodiments, the foam may also be a fluorine-containing foam. The fluorine-free and/or fluorine-containing foam may especially be suitable for discharge with an foaming rate customary for a low-expansion foam.

In some embodiments, the liquid hazardous material comprises a combustible liquid. In some embodiments, the liquid hazardous material comprises a combustible liquid having a combustion point greater than −22° C., especially having a combustion point greater than −7° C. In some embodiments, the combustible liquid comprises one or more of the following: an alcohol, an ester, a carboxylic acid, an amine, and aldehyde, or an ether.

In some embodiments, the liquid hazardous material may especially comprise a combustible liquid. This combustible liquid may especially be a water-insoluble combustible liquid. In some embodiments, the liquid hazardous material may comprise a liquid having a combustion point below 21° C. In some embodiments, the liquid hazardous material may comprise a liquid having a combustion point between 21° C. and 55° C. In some embodiments, the liquid hazardous material may comprise a liquid having a combustion point between 55° C. and 100° C. In some embodiments, the liquid hazardous material may comprise a liquid which is water-soluble at 15° C. and has a combustion point below 21° C.

In some embodiments, the liquid hazardous material may also comprise combinations of these hazardous materials. In some embodiments, the liquid hazardous materials may be stored chaotically in storage vessels. This means that the liquid hazardous materials may be stored in different kinds of storage vessels, for example IBCs and canisters and/or IBCs and canisters and drums and/or canisters and/or drums, with no defined storage positions for the individual liquid hazardous materials. However, the fire protection system of the invention is not limited to this type of storage. It is also possible to use the fire protection system of the invention to protect a fire protection area in which both liquid hazardous material and conventional hazardous materials are stored, i.e. in the case of mixed storage.

In a further aspect, the invention relates to a fluid-directing element for use in the fire protection system of the invention, which is configured to direct liquid hazardous material into the at least one collecting area in the event of leaking of the liquid hazardous material from the at least one storage vessel. In some embodiments, the fluid-directing element may comprise at least one base area and an associated oblique fluid-directing surface, in which case the fluid-directing element is arranged such that the at least one oblique fluid-directing surface declines in a fluid-directing direction of the at least one collecting area, in order thus to direct the liquid hazardous material into the at least one collecting area in the event of leaking of the liquid hazardous material from the at least one storage vessel.

In some embodiments, the oblique fluid-directing surface, relative to the horizontal, which is parallel to the base surface, may decline at an angle of between 1° and 90°, preferably between 10° and 45°, even further preferably between 20° and 30°.

In some embodiments, the fluid-directing element may also have at least one fluid barrier surface which extends upward at right angles from the base surface in the direction of the roof arrangement. In some embodiments, the at least one fluid barrier surface may be executed as a lateral surface of the fluid-directing element. In some embodiments, the fluid-directing element may also have at least one connecting piece configured to interact with at least one connecting piece of a further fluid-directing element in order to connect the fluid-directing elements to one another in a fluid-tight manner.

In yet a further aspect, the invention relates to an extinguishing fluid outlet for use in the fire protection system of the invention, wherein the extinguishing fluid outlet is configured to discharge an extinguishing fluid with a first defined directional characteristic. In some embodiments, the extinguishing fluid outlet has a directing element, especially a spray plate element, configured to fix the first defined directional characteristic. In some embodiments, the extinguishing fluid outlet is configured to discharge the extinguishing fluid with a foaming rate of greater than 0.5, preferably greater than 1.0, more preferably greater than 1.5, more preferably greater than 5. In some embodiments, the extinguishing fluid outlet is configured to discharge water as extinguishing fluid.

In yet a further aspect, the invention relates to a unit in block form for use in the fire protection system of the invention, comprising at least two extinguishing fluid outlets configured to discharge an extinguishing fluid with a first defined directional characteristic. In some embodiments, a first extinguishing fluid outlet and a second extinguishing fluid outlet may preferably be arranged relative to one another at an angle of 30°, further preferably of 60°, even further preferably of 90°, even further preferably of 120°, even further preferably of 180°.

In yet a further aspect, the invention relates to a method of providing a fire protection area for fire protection for liquid hazardous material, wherein the method comprises: providing at least one storage arrangement for storage of the liquid hazardous material in at least one storage vessel, providing at least one collecting area, providing a first plurality of extinguishing fluid outlets, and configuring the at least one storage arrangement to direct the liquid hazardous material into the at least one collecting area in the event of leaking of the liquid hazardous material from the at least one storage vessel, and aligning the at least one storage arrangement, the at least one collecting area and the first plurality of extinguishing fluid outlets relative to one another in such a way that the first plurality of extinguishing fluid outlets is configured to discharge the extinguishing fluid into the at least one collecting area in case of a fire event of the liquid hazardous material.

In yet a further aspect, the invention relates to the use of an extinguishing fluid for use with a non-hazardous material, especially a low expansion foam, by means of a fire protection system of the invention for firefighting in the event of a liquid hazardous material.

Even though the preferred embodiments of the invention have already been elucidated above in association with the aspect of the fire protection system, it will be appreciated at this point, however, that the preferred embodiments equally also correspond to preferred embodiments of the further aspects of the invention, which, merely in order to avoid repetition, have not been described once again individually.

BRIEF DESCRIPTION OF THE DRAWINGS

The invention is described in detail hereinafter with reference to the appended figures by preferred working examples.

FIG. 4 (*b*) shows a schematic top view of an extinguishing fluid outlet with defined directional characteristic in the first embodiment;

FIG. 6 (*b*) shows a schematic perspective view of a fluid-directing element in a second variant;

FIG. 6 (*c*) shows a schematic perspective view of a fluid-directing element in a third variant.

DETAILED DESCRIPTION OF THE INVENTION

Figure 1:
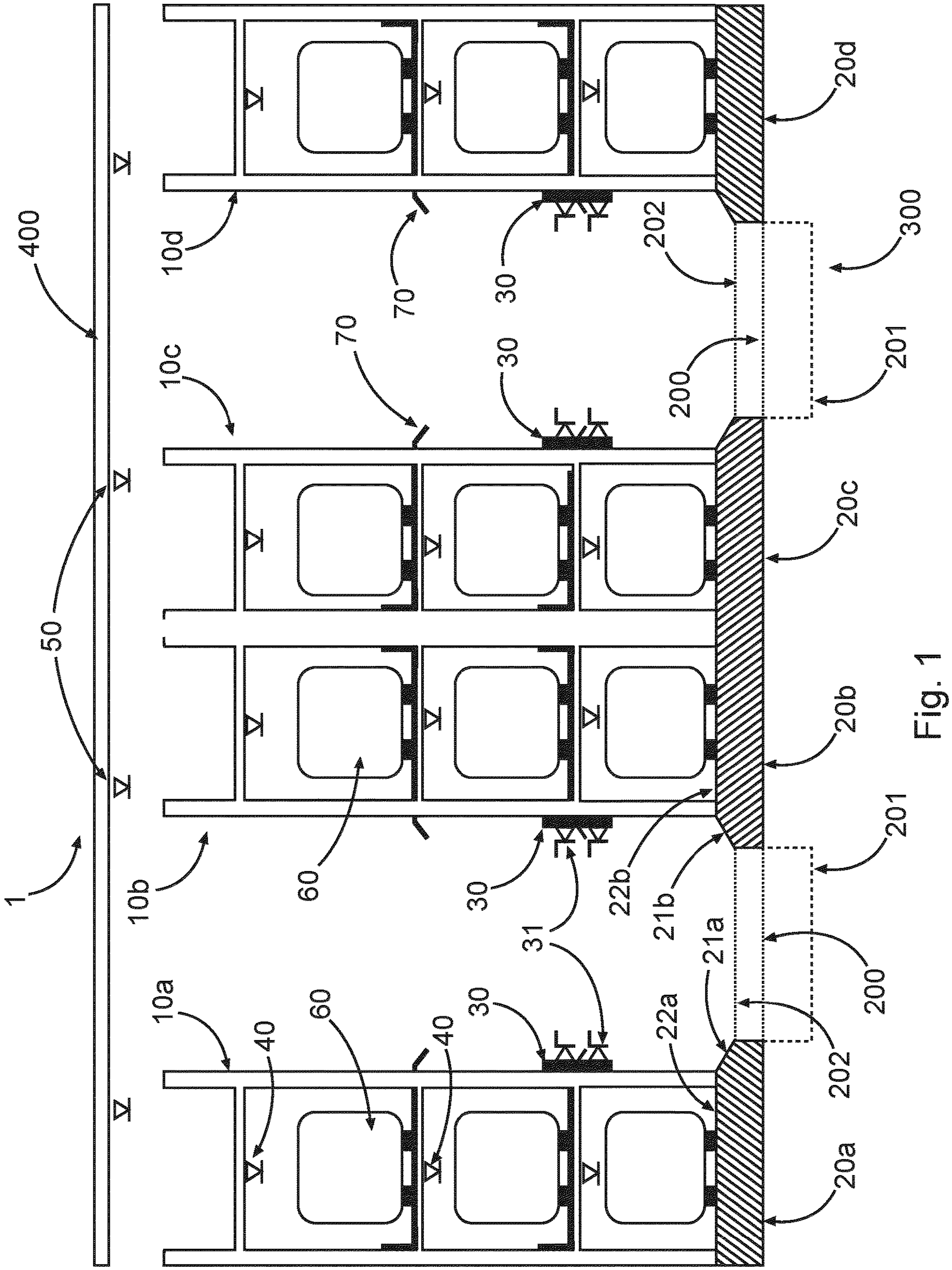
FIG. 1 shows a schematic construction of a side view of a fire protection system in a first embodiment.

FIG. 1 shows, in schematic form and by way of example, a side view of a fire protection system 1 in a first embodiment. The fire protection system 1 comprises storage arrangements 10*a*, 10*b*, 10*c* and 10*d*, each disposed on fluid-tight elevations 20*a*, 20*b*, 20*c* and 20*d*. In the specific embodiment of FIG. 1, storage arrangements 10*a*, 10*b*, 10*c* and 10*d* especially comprise rack arrangements in which storage vessels 60 are disposed. Storage vessels 60 may hereby take the form of different storage vessels, for example canisters, drums or IBCs.

On each of the storage arrangements 10*a*, 10*b*, 10*c* and 10*d* are disposed units 30 in block form. In the specific embodiment of FIG. 1, the units 30 in block form each comprise two extinguishing fluid outlets 31 from a first plurality of extinguishing fluid outlets, which, in the specific embodiment of FIG. 1, are configured as sprinklers. Extinguishing fluid outlets 31 are configured here to discharge the extinguishing fluid with a first defined directional characteristic. The first defined directional characteristic is preferably such here that the extinguishing fluid is preferably discharged uniformly in a particular direction and hence does not have a 360° characteristic. The mode of function of an extinguishing fluid outlet 31 with the first defined directional characteristic is elucidated in detail once again hereinafter in relation to FIG. 4.

Also disposed on the storage arrangements 10*a*, 10*b*, 10*c* and 10*d* are a number of extinguishing fluid outlets 40 that belong to the second plurality of extinguishing fluid outlets. Extinguishing fluid outlets 40, in the specific embodiment of FIG. 1, are likewise configured as sprinklers and have a second defined directional characteristic for the extinguishing fluid. The second defined directional characteristic is preferably a 360° directional characteristic, under which the extinguishing fluid is discharged uniformly in all directions. Even though, in the exemplary embodiment of FIG. 1, extinguishing fluid outlets 40 of the second plurality of extinguishing fluid outlets are disposed on storage arrangements 10*a*, 10*b*, 10*c* and 10*d*, it is alternatively or additionally also possible for extinguishing fluid outlets 31 of the first plurality of extinguishing fluid outlets to be disposed on one or more of storage arrangements 10*a*, 10*b*, 10*c* and 10*d*. In addition, even though, in the exemplary embodiment of FIG. 1, the extinguishing fluid outlets 40 of the second plurality of extinguishing fluid outlets are disposed above the storage vessel 60, these extinguishing fluid outlets 40 of the second plurality, alternatively or additionally together with the extinguishing fluid outlets 31 of the first plurality, may also be disposed at different positions within and/or on storage arrangements 10*a*, 10*b*, 10*c* and 10*d*.

The elevations 20*a*, 20*b*, 20*c* and 20*d* are configured such that storage arrangements 10*a*, 10*b*, 10*c* and 10*d* are configured thereon. For this purpose, elevations 20*a*, 20*b*, 20*c* and 20*d* each have a straight surface 22*a* and 22*b* (the straight surfaces of elevations 20*c* and 20*d* are not numbered for the sake of clarity). Even though elevations 20*a*, 20*b*, 20*c* and 20*d* in the specific embodiment of FIG. 1 have straight surfaces 22*a*, 22*b* as positioning surfaces, the function as a positioning surface in other embodiments may also be provided by the oblique surfaces 21*a*, 21*b* if they are designed in sufficiently large dimensions for the purpose.

The elevations 20*a*, 20*b*, 20*c* and 20*d* are also configured to direct the liquid hazardous material that has escaped from one of the storage vessels 60 in the direction of the collecting area 200. For this purpose, the elevations 20*a*, 20*b*, 20*c* and 20*d* each have an oblique surface 21*a* and 21*b* (the oblique surfaces of the elevations 20*c* and 20*d* are likewise not numbered for the sake of clarity). In some embodiments, the oblique surfaces may especially have a slope of about 1.0%, preferably 1.5%. The oblique surfaces 21*a* and 21*b* are configured to direct the liquid hazardous material, if it has escaped from one of the storage vessels 60 disposed in the lowermost level of the storage arrangement 10*a*, 10*b*, 10*c* and 10*d*, in the direction of the collecting area 200.

The collecting area 200 is hereby formed by the base 300 in the interspace between any two storage arrangements 10*a*, 10*b*, 10*c* and 10*d*. For instance, the area of the base 300 between the storage arrangements 10*a* and 10*b* forms a first collecting area 200, and the area of the base 300 between the storage arrangements 10*c* and 10*d* forms a second collecting area 200.

The first and second collecting areas 200 each comprise a plurality of fluid receptacles 201 (only one in each case can be seen in FIG. 1 due to perspective), configured as depressions in the respective collecting area 200—and hence in the base 300. Since the first and second collecting areas 200 are formed by the base 300 in the interspace between the storage arrangements 10*a* and 10*b* or 10*c* and 10*d*, the first and second collecting areas 200 have a length corresponding to that of storage arrangements 10*a* and 10*b* or 10*c* and 10*d*. The first and second collecting areas 200 thus have a first end—at the starting point of the storage arrangement 10*a* and 10*b* or 10*c* and 10*d*—and a second end—at the end point of the storage arrangement 10*a* and 10*b* or 10*c* and 10*d*. In the specific embodiment of FIG. 1, the first and second collecting areas 200 each have a fluid barrier element 202 at their respective first and second ends (only one is shown in FIG. 1 due to perspective), which blocks the fluid flow of the liquid hazardous material in longitudinal direction of the first and second collecting areas 200.

The storage arrangement 10*a* and 10*b*, and 10*c* and 10*d*, further comprises a plurality of fluid-directing elements 70 that are disposed beneath the storage vessels 60 in the higher levels of the storage arrangement 10*a* and 10*b*, and 10*c* and 10*d*. The fluid-directing elements 70 have at least one base surface and an oblique fluid-directing surface connected thereto, as described once again in detail in association with FIG. 5.

The functioning of the fluid-directing elements 70 basically corresponds to the functioning of the fluid-tight elevation 20*a*, 20*b*, 20*c* and 20*d*, except that the fluid-directing elements 70 exert this function for the storage vessels 60 that are not at the lowermost level of the storage arrangement 10*a*, 10*b*, 10*c* and 10*d*. For instance, the fluid-directing elements 70, in the event of leaking of the liquid hazardous material from a storage vessel, have the effect that the liquid hazardous material cannot escape either to the reverse side of the storage arrangement 10*a* and 10*b*, and 10*c* and 10*d*, or to the sides of the storage arrangement 10*a* and 10*b*, and 10*c* and 10*d*, but is instead directed downward via the oblique fluid-directing surface in the direction of the collecting area 200.

The fire protection system 1 of FIG. 1 further comprises a roof arrangement 400 on which a plurality of extinguishing fluid outlets 50 is disposed. In the specific embodiment of FIG. 1, the extinguishing fluid outlets 50 are implemented as sprinklers. The extinguishing fluid outlets 50 likewise have a second defined directional characteristic, especially a 360° directional characteristic—for the extinguishing fluid that exits therefrom. Even though the extinguishing fluid outlets 40 and the extinguishing fluid outlets 50 in the specific embodiment of FIG. 1 have the same directional characteristic, it will be appreciated at this point that the extinguishing fluid outlets 40 and the extinguishing fluid outlets 50 may have different directional characteristics. In some embodiments, the extinguishing fluid outlets 40 and extinguishing fluid outlets 50 may also be configured such that different portions of the extinguishing fluid outlets 40 and/or different portions of the extinguishing fluid outlets 50 have different directional characteristics. In some embodiments, every extinguishing fluid outlet from the plurality of extinguishing fluid outlets 40 and/or the plurality of extinguishing fluid outlets 50 may have a different directional characteristic. Further combinations are conceivable.

Figure 2:
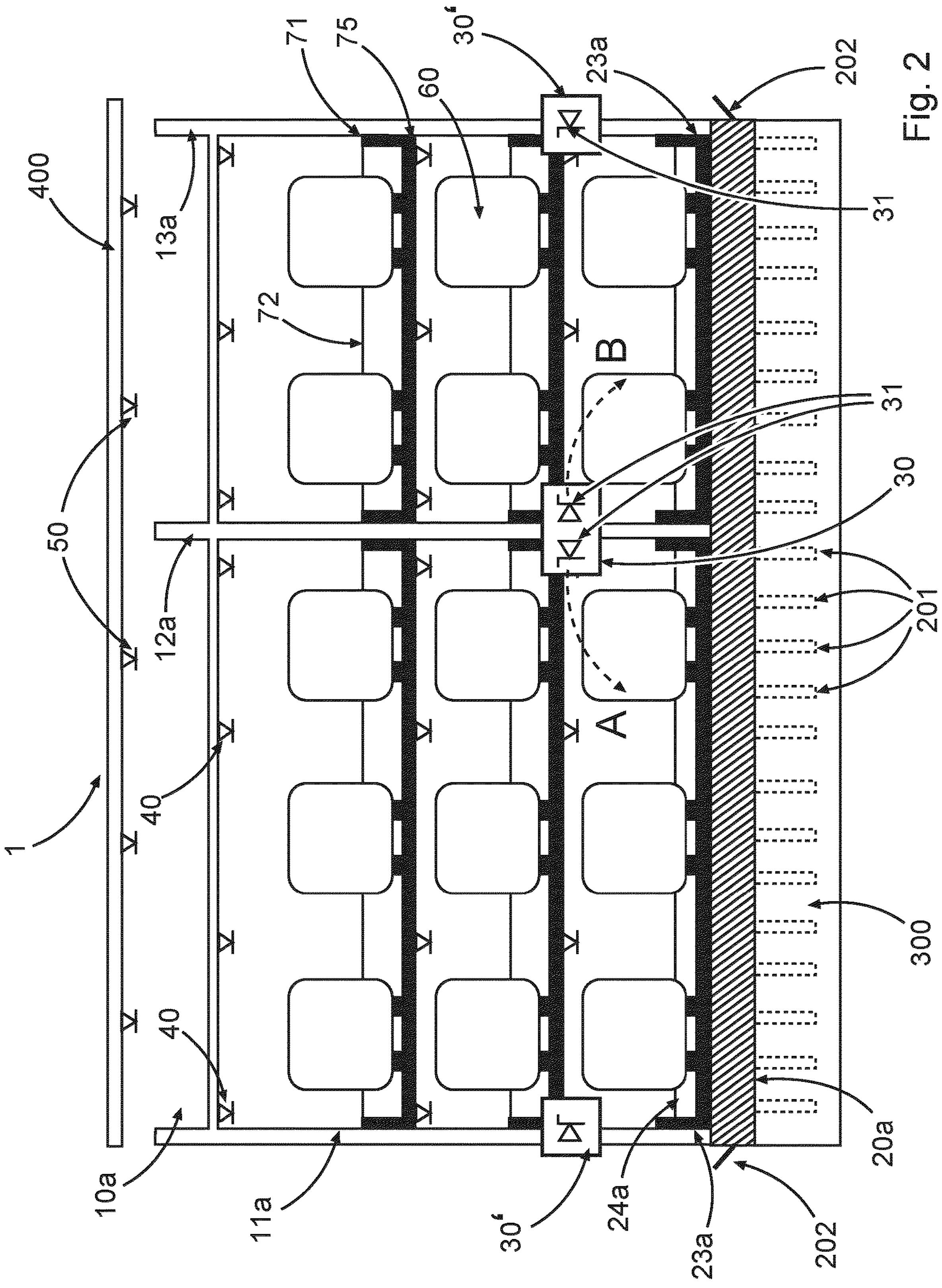
FIG. 2 shows a schematic construction of a front view of a fire protection system in the first embodiment.

FIG. 2 shows a front view of the fire protection system of FIG. 1. Identical elements are identified by the same reference numerals, and so these are not specifically discussed again hereinafter. For instance, FIG. 2 shows the storage arrangement 10*a* in which storage vessels 60 are stored. The storage arrangement 10*a* is disposed atop the fluid-tight elevation 20*a*, implemented as described in relation to FIG. 1.

As shown in FIG. 2, the storage arrangement 10*a* has two lateral fluid barrier elements 23*a* that interact in a fluid-tight manner with the fluid-tight elevation 20*a* in order to prevent the liquid hazardous material from flowing away via the sides of the storage arrangement 10*a*. In addition, the storage arrangement 10 has a fluid barrier element 24*a* on the reverse side, which interacts in a fluid-tight manner with the fluid-tight elevation 20*a* in order to prevent the liquid hazardous material from flowing away via the reverse side of the storage arrangement 10*a*. In this way, it is possible for the liquid hazardous material that has escaped from the storage vessels 60 in the lowermost level of the storage arrangement 10*a* to be directed via the oblique surface 21*a* (not shown) into the collecting area 200.

As likewise shown in FIG. 2, the collecting area 200 comprises a plurality of fluid receptacles 201, configured as depressions in the base 300. The dimensions of the fluid receptacles 201 here are preferably such that they can accommodate the contents of an entire storage vessel 60. This can prevent spread of the liquid hazardous material over a large area and hence keep the fire area small in the case of a fire event, in order to be able to fight the fire event in a localized manner. The liquid hazardous material thus collects not in the collecting area 200 but primarily in the fluid receptacles 201.

In addition, the collecting area 200 comprises at least two fluid barrier elements 202 disposed at the first and second ends of the collecting area 200, in order to prevent the liquid hazardous material from spreading in longitudinal direction of the storage arrangement 10*a*. In the specific embodiment of FIG. 2, these fluid barrier elements 202 are implemented as oblique elements. The fluid barrier elements 202 may alternatively, analogously to the fluid barrier elements 23*a*, be implemented as elements that run vertically relative to the base.

FIG. 2 additionally shows a plurality of extinguishing fluid outlets 40 disposed within the storage arrangement 10*a*. In the specific embodiment of FIG. 2, these extinguishing fluid outlets 40 are especially executed as sprinklers, which are configured to distribute the extinguishing fluid, for example water, a low-expansion foam, a medium-expansion foam and/or a combination thereof, with a 360° directional characteristic over the storage surfaces of the storage arrangement 10 and the storage vessels 60. In this way, it is possible to fight a fire event directly when it occurs upon leaking from the storage vessel 60 and prior to being directed into the collecting area. This prevents spreading of the fire event.

FIG. 2 also shows a front view of the units in block form, on which are disposed, in the specific embodiment of FIG. 2, depending on the position, one or two extinguishing fluid outlets 31. The units 30 in block form are disposed here on positioning elements 11*a*, 12*a*, 13*a* of the storage arrangement 10*a*, especially on the rack uprights of a rack. These extinguishing fluid outlets 31 are aligned here such that, by means of their first defined directional characteristic, they distribute the extinguishing fluid along the collecting area 200, especially via the fluid receptacles 201, in order to thus be able to fight any fire events. The discharge direction of the extinguishing fluid outlets is shown by way of example in FIG. 2 by the dotted arrows A and B.

Figure 3:
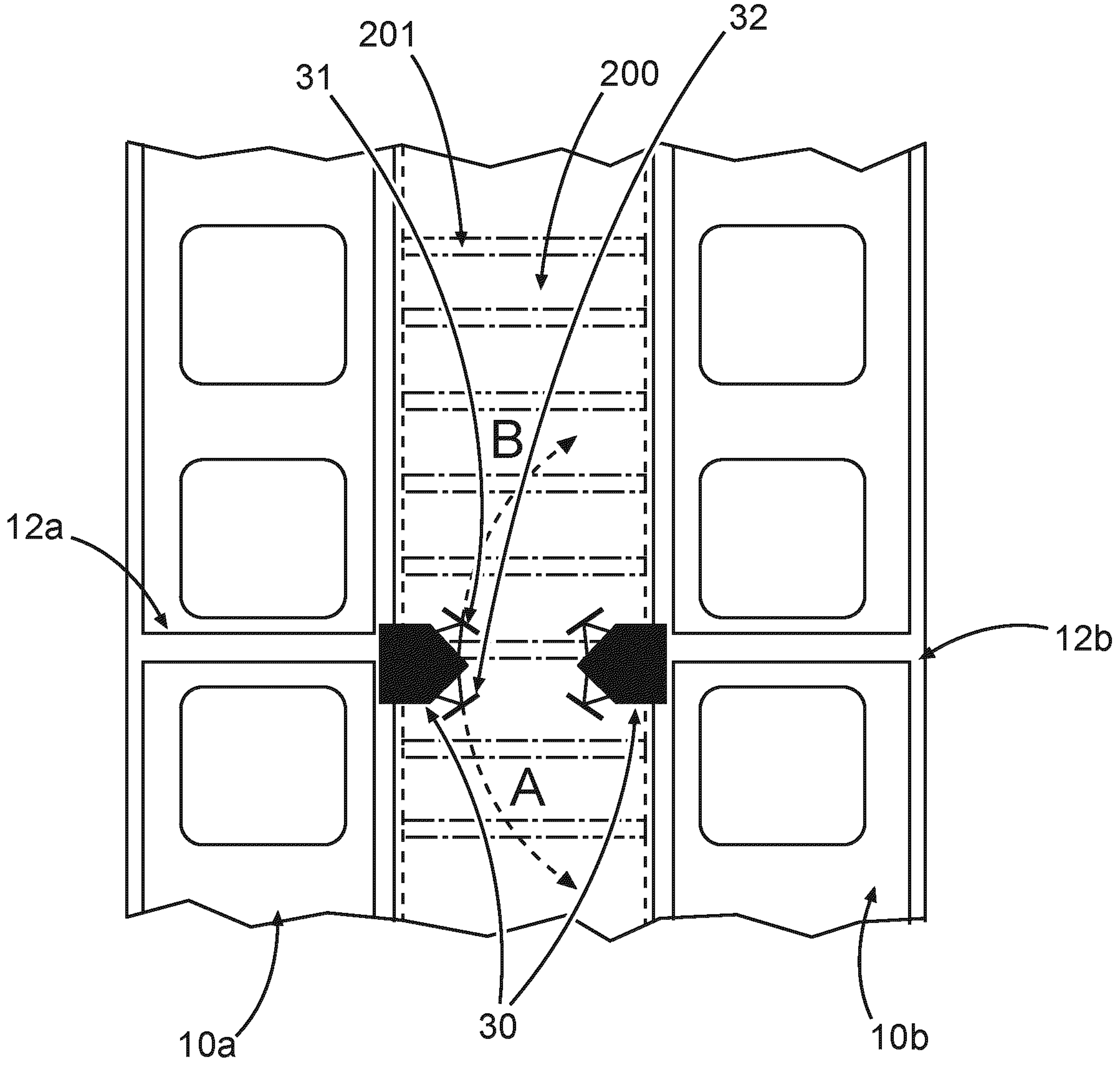
FIG. 3 shows a schematic construction of a top view of a fire protection system in the first embodiment.

The alignment of the extinguishing fluid outlets 31 is now elucidated in detail in relation to FIG. 3. FIG. 3 shows a top view of the storage arrangements 10*a* and 10*b* and the intervening collecting area 200 with the fluid receptacles 201. Disposed on the positioning element 12*a* of the storage arrangement 10*a* and the positioning element 12*b* of the storage arrangement 10*b* is a unit 30 in block form, configured to accommodate two extinguishing fluid outlets 31 with the first defined directional characteristic. As shown by the top view of the unit 30 in block form, the extinguishing fluid outlets 31 are arranged such that their central axes are aligned at a certain angle relative to one another. In the specific embodiment of FIG. 3, this angle is 120°. In other embodiments, however, it may also be less, especially between 90° and 119° or more, especially 121° to 180°. This alignment and the directional characteristics of the extinguishing fluid outlets 31 make it possible to cover the entire collecting area 200 by means of the extinguishing fluid outlets 31 on the units 30 in block form. FIG. 3 shows the direction in which the extinguishing fluid can be discharged once again in schematic form by means of arrows A and B.

Figure 4A:
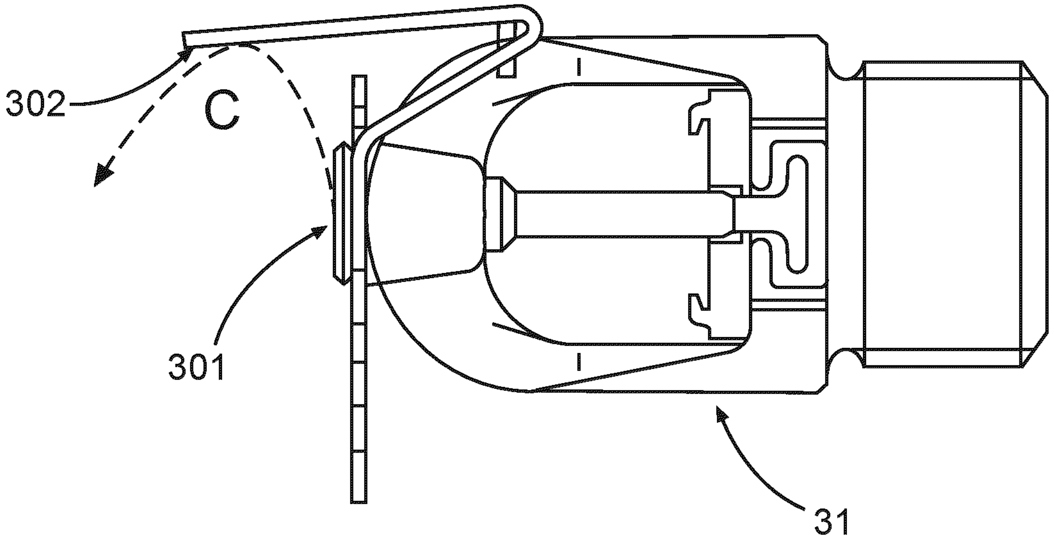
FIG. 4 (*a*) shows a schematic side view of an extinguishing fluid outlet with defined directional characteristic in a first embodiment.
Figure 4B:
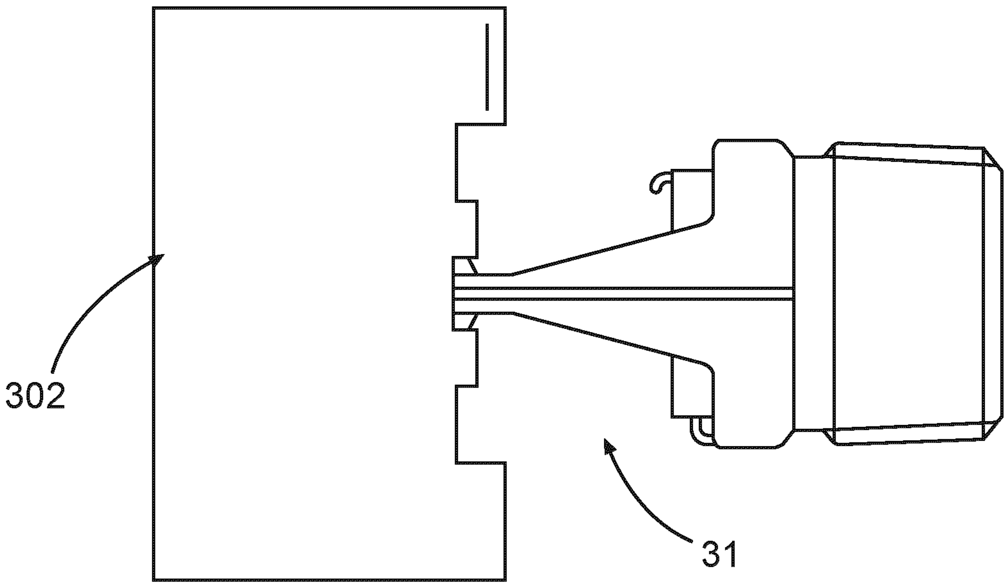

A specific configuration of an extinguishing fluid outlet 31 with a directional characteristic for the extinguishing fluid is described once again hereinafter in relation to FIG. 4. In this context, FIG. 4 (*a*) shows a side view of the extinguishing fluid outlet 31, and FIG. 4 (*b*) shows a top view of the extinguishing fluid outlet 31. The extinguishing fluid outlet 31, in the specific embodiment of FIG. 4, is implemented as a sprinkler having an outlet opening 301 and a spray plate 302. If the sprinkler is triggered, for example due to a change in temperature, extinguishing fluid is discharged from the outlet opening 301. In the specific embodiment of FIG. 4, the sprinkler 301 is particularly configured to discharge water or a foam, especially a low-expansion or medium-expansion foam, as extinguishing fluid with the defined directional characteristic. In order to discharge a foam, the sprinkler 301 is preferably configured to achieve a foaming rate of more than 0.5, preferably of more than 1.0, even more preferably of more than 1.5, even more preferably of between 1.5 and 20.

When the extinguishing fluid exits from the discharge opening 301, the spray plate 302, by virtue of its specific arrangement, has the effect that the extinguishing fluid exiting from the discharge opening 301 in the direction of the spray plate 302 is deflected by the spray plate 302, as shown by arrow C, and is thus aligned in the appropriate direction together with the extinguishing fluid that has already exited in that direction. Thus, a directional characteristic of the extinguishing fluid is achieved which, depending on the arrangement of the spray plate 302 and the sprinkler 31 in relation to the fire protection area, enables discharge of the extinguishing fluid directed to a specific position.

The arrangement of at least two extinguishing fluid outlets 31 from the first plurality of extinguishing fluid outlets of the unit 30 in block form is elucidated hereinafter in relation to FIG. 5.

Figure 5:
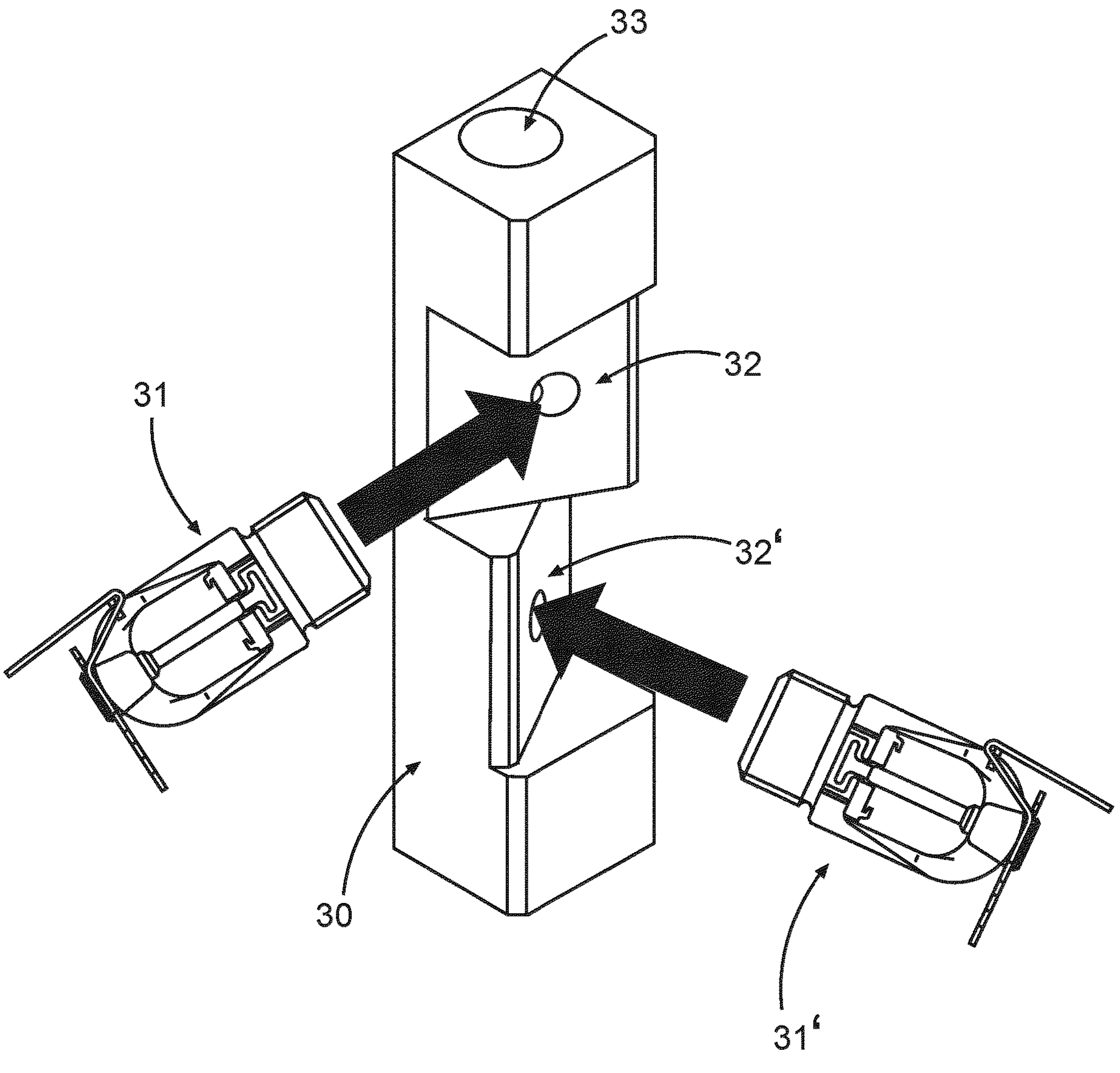
FIG. 5 shows a schematic perspective view of a unit in block form in one embodiment.

More particularly, FIG. 5 shows a unit 30 in block form, configured such that two extinguishing fluid outlets, especially two sprinklers as described in association with FIG. 4, can be arranged thereon at a particular angle relative to one another. In the specific embodiment of FIG. 5, this angle between the central axes of sprinkler 31 and of sprinkler 31' is about 30°. For installation on the unit 30 in block form, the sprinklers 31, 31' are applied in the direction of the arrow to the installation surfaces 32, 32' such that the extinguishing fluid inlet thereof is connected to an extinguishing fluid outlet on the respective installation surface 32, 32'. The unit 30 in block form also has an extinguishing fluid inlet 33 via which the extinguishing fluid can be conducted through the unit 30 in block form to the sprinklers 31, 31', in order to conduct it via the extinguishing fluid outlets of the unit 30 in block form into the extinguishing fluid inlets of the sprinklers 31, 31'. The unit 30 in block form thus enables mounting of the extinguishing fluid outlets, especially the sprinklers 31, 31', in a fixed arrangement on the rack arrangement. This simplifies installation.

Figure 6A:
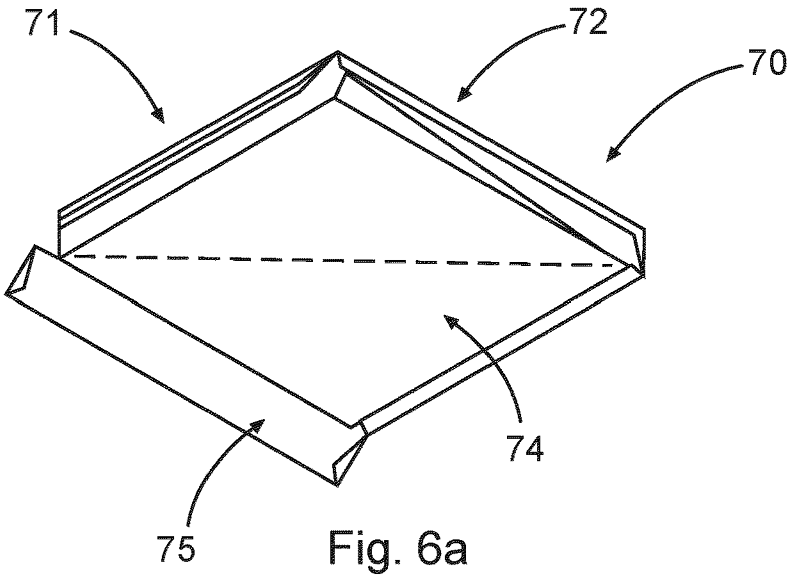
FIG. 6 (*a*) shows a schematic perspective view of a fluid-directing element in a first variant.
Figure 6B:
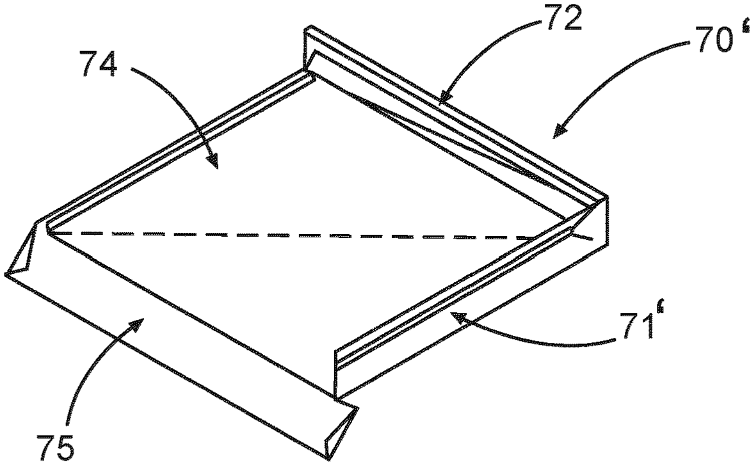
Figure 6C:
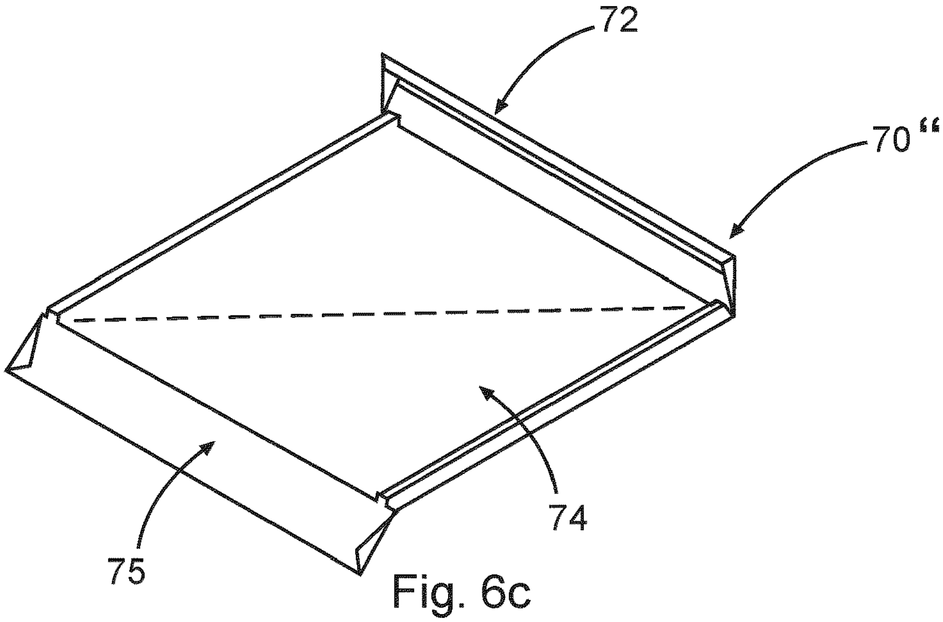

The functioning of the fluid-tight elements 70 is now elucidated once again in relation to FIG. 6. In this regard, FIG. 6 (*a*) shows a schematic perspective view of a fluid-directing element 70 in a variant which is configured for arrangement on a starting or final position of a storage arrangement 10*a*, 10*b*, 10*c*, 10*d*, and FIG. 6 (*b*) shows a schematic perspective view of a fluid-directing element 70' in a variant configured for arrangement on the opposite side, i.e. likewise at the starting or final position of a storage arrangement 10*a*, 10*b*, 10*c*, 10*d*. FIG. 6 (*c*), moreover, shows a schematic perspective view of a fluid-directing element 70" in a variant configured for arrangement in the middle in a storage arrangement 10*a*, 10*b*, 10*c*, 10*d*.

The fluid-directing element 70 according to FIG. 6 (*a*) has a base area 74, a first lateral surface 71, a reverse-side surface 72 and an oblique fluid-directing surface 75. In the specific embodiment of FIG. 6, the first lateral surface 71 and the reverse-side surface 72 are configured to extend roughly vertically with respect to the plane which is formed by the base area 74, specifically in an opposite direction to the fluid-directing direction of the fluid-directing surface 75. When the fluid-directing element 70 is inserted into the storage arrangement 10*a*, 10*b*, 10*c*, 10*d*, this means that the first lateral surface 71 and the reverse-side surface 72 extend vertically relative to the base surface in the direction of the roof arrangement 400. The fluid-directing surface 75 extends obliquely in the opposite direction, preferably at an angle of 30°, even further preferably 45°, further preferably 60°. When the fluid-directing element 70 is inserted into the rack arrangement 10*a*, 10*b*, 10*c*, 10*d*, this means that the fluid-directing direction extends obliquely in the direction of the base 300.

The fluid-directing element 70' of FIG. 6 (*b*) is constructed analogously to the fluid-directing element of FIG. 6 (*a*), but as a mirror-image thereof, in order thus to form the counterpart for the opposite end of the storage arrangement 10*a*, 10*b*, 10*c*, 10*d*. The fluid-directing element 70' according to FIG. 6 (*b*) thus has a base area 74, a second lateral surface 71', a reverse-side surface 72 and an oblique fluid-directing surface 75, wherein the directions of extension of the second lateral surface 71' and of the reverse-side surface 72, and of the fluid-directing surface 75, are executed analogously to the variant of FIG. 6 (*a*), and reference is therefore made at this point to FIG. 6 (*a*) for the sake of clarity.

The fluid-directing element 70" of FIG. 6 (*c*) is likewise executed similarly to the fluid-directing elements of FIGS. 6 (*a*) and 6 (*b*), with the fluid-directing element 70" having no lateral surface since it is executed for the middle arrangement, i.e. the arrangement between the fluid-directing elements 70 and 70' in the case of three-position storage. The functioning of the base surface 74, the reverse-side surface 72 and the fluid-directing surface 75 corresponds to that of FIGS. 6 (*a*) and 6 (*b*), and reference is therefore again made at this point especially to the observations relating to FIG. 6 (*a*).

The fluid-directing elements 70 and 70' also have one connecting element each (not shown in FIGS. 6 (*a*) and 6 (*b*)), respectively disposed on the opposite side from the first or second side element and configured for connection to a further fluid-directing element. The fluid-directing element 70" has two connecting elements (not shown in FIG. 6 (*c*)) that are disposed on the two sides of the fluid-directing element 70" and are configured for connection to one fluid-directing element each.

The connecting elements may particularly be executed as overlapping segments of the base surface 74 and of the fluid-directing surface 75 and are especially configured to connect the fluid-directing elements 70, 70' and 70" to one another in a fluid-tight manner. This connection can be secured here by any securing element, for example rivets, screws or the like.

There follows an elucidation of the manner of function of the fluid-directing elements in relation to FIGS. 6 (*a*) to 6 (*c*).

Depending on the mode of storage—either three-position storage in which three storage vessels 60—or pallets with storage vessels disposed thereon—are disposed between two positioning elements of the storage arrangement 10*a*, 10*b*, 10*c*, 10*d*, or two-position storage, in which two storage vessels 60—or pallets with storage vessels disposed thereon—are disposed between two positioning elements of the storage arrangement 10*a*, 10*b*, 10*c*, 10*d*—either three fluid-directing elements 70, 70" and 70' or two fluid-directing elements 70, 70' are connected to one another by connecting and securing the connecting elements of the individual fluid-directing elements to one another in a fluid-tight manner. The fluid-directing elements 70, 70', 70" connected to one another in this way are then inserted into the storage arrangement 10*a*, 10*b*, 10*c*, 10*d*. Then, depending on the mode of storage, two or three storage vessels 60 are positioned on the base surfaces 74 of the connected fluid-directing elements 70, 70', 70". If liquid hazardous material then leaks from one of the storage vessels 60, this is provided to the base surfaces 74 and spreads out thereon. The liquid hazardous material is prevented here from spreading by the reverse-side surfaces 72 and the first lateral surface 71 and the second lateral surface 71', in that these function as fluid barriers. As a result, it is possible for the liquid hazardous material to spread only in the direction of the fluid-directing surfaces 75, by means of which it is directed into the collecting area 200, where it is preferably directed into the fluid receptacles 201. This way, the liquid hazardous material may be collected in the fluid receptacles 201 and be extinguished there if necessary. Since the liquid hazardous material in the fluid receptacles 201 has only a low surface area, the spread of a fire is greatly restricted and firefighting can be conducted in a localized manner. This eases firefighting.

In addition, the manner of function of the fire protection system according to FIGS. 1 to 3 is elucidated with reference to these figures and to FIGS. 4 and 5.

It may be the case that liquid hazardous material escapes from one of the storage vessels 60. If the storage vessel 60 in question is at the lowermost level of the storage arrangement 10*a*, 10*b*, 10*c*, 10*d*, the liquid hazardous material will arrive on the fluid-tight elevation 20*a*, 20*b*, 20*c*, 20*d* and spread over the straight area 22*a*, 22*b* of the fluid-tight elevation 20*a*, 20*b*, 20*c*, 20*d*. The fluid-tight elevation 20*a*, 20*b*, 20*c*, 20*d* comprises corresponding fluid barrier elements 23*a*, 24*a* for this purpose, which act as a barrier for the spreading liquid hazardous material, such that the liquid hazardous material cannot penetrate the sides of the fluid-tight elevation 20*a*, 20*b*, 20*c*, 20*d* or the reverse side of the fluid-tight elevation 20*a*, 20*b*, 20*c*, 20*d*, but is instead guided solely via the oblique surface 21*a*, 21*b* in the direction of the collecting area 200, in order to be collected there.

If the storage vessel 60 in question is at a higher level of the storage arrangement 10*a*, 10*b*, 10*c*, 10*d*, the liquid hazardous material, after leaking, will arrive on the fluid-directing elements 70, 70', 70", which are arranged within the storage arrangement 10*a*, 10*b*, 10*c*, 10*d* as in connection with FIG. 6. Here too, the liquid hazardous material will spread on the straight base surface 74, which serves as a positioning surface for the storage vessel 60. The fluid-directing elements 70, 70', 70" are arranged here such that they have a reverse-side face 72 and a first and second lateral face 71, 71', which serve as fluid barriers for the fluid-directing elements, i.e. prevent the leaked liquid hazardous material from escaping via the sides or reverse face of the storage arrangement 10*a*, 10*b*, 10*c*, 10*d*. Instead, the liquid hazardous material is guided via the fluid-directing surface 75, configured as an oblique surface, away from the fluid-directing element 70, 70', 70" and hence from the storage vessel 60 in the direction of the collecting area 200, in order to be collected there.

The liquid hazardous material is typically a combustible liquid having a combustion point down to −7° C., for example. This means that the liquid hazardous material is flammable at room temperature. If it escapes from the storage vessel 60, there is the risk that the liquid hazardous material will ignite, for example as a result of sparking. This fire event results in a temperature rise which can ensure that the first plurality of extinguishing fluid outlets 31 and the second plurality of extinguishing fluid outlets 40, 50, preferably executed as sprinklers in the embodiment according to FIGS. 1 to 5, are triggered. The evolution of heat here is local, such that the only extinguishing fluid outlets triggered are those in the vicinity of the fire event.

If, for example, liquid hazardous material escapes from a storage vessel at the second-lowest level of the storage arrangement 10*a*, 10*b*, 10*c*, 10*d*, the liquid hazardous material, as described above, is distributed over the base surface 74 of the fluid-directing element 70, 70', 70". In the event of sparking, the liquid hazardous material can ignite there. This leads to a temperature rise in the area of those extinguishing fluid outlets 40 disposed within the storage arrangement 10*a*, 10*b*, 10*c*, 10*d* in the immediate proximity of the storage vessel 60 in question. These extinguishing fluid outlets 40 are then triggered and release an extinguishing fluid with a 360° spray profile. Since these extinguishing fluid outlets 40 are disposed in the area of the rise in temperature, the extinguishing fluid exiting from the extinguishing fluid outlets 40 will affect the area in which the fire event is occurring.

In addition, liquid hazardous material is directed in the direction of the collecting area 200 by the arrangement of the fluid-directing elements 70, 70', 70".

Disposed in the collecting area 200 are a plurality of fluid receptacles 201. The number and size of the fluid receptacles 201 is chosen here such that the fluid receptacles 201 can accommodate the entire contents of a storage vessel 60. The fluid receptacles 201 are executed as narrow channels sunk deep into the floor 300. This execution in the form of deep channels allows the liquid hazardous material to collect in the fluid receptacles 201, in which case it has only a low surface area that can be on fire. This enables localized firefighting.

In the collecting area 200 too, the liquid hazardous material results in a temperature rise. The effect of this is that the extinguishing fluid outlets 31 disposed on the unit 30 in block form on at least one adjusting element 11*a*, 12*a*, 13*a* of the storage arrangement 10*a*, 10*b*, 10*c*, 10*d* are triggered. The extinguishing fluid outlets 31, which are implemented as sprinklers in the specific embodiment of FIGS. 1 to 5, result here in a directional characteristic for the exiting extinguishing fluid, as described in connection with FIG. 4. This directional characteristic here is such that the extinguishing fluid exiting from the extinguishing fluid outlets 31 is directed in the direction of the collecting area 200, especially in the direction of the fluid receptacles 201.

This interaction of extinguishing fluid directed onto a target area and collecting, by means of the fluid receptacles 201, of the liquid hazardous material in the area into which the fluid has been directed results in rapid and controlled extinguishment of the liquid hazardous material. In particular, it is possible by means of this arrangement of extinguishing fluid outlets 31 and fluid receptacles 201 to provide a method that enables control and possibly extinguishing of liquid hazardous materials even by means of an extinguishing fluid which is otherwise typically not usable for hazardous materials of this kind. In order to provide this specific combination, the extinguishing fluid outlets are especially arranged such that they discharge in different directions, as also shown schematically in FIG. 2.

As mentioned above, it is possible not just to control the liquid hazardous material in the collecting area by means of the extinguishing fluid outlets 31, 40, 50, but also the liquid hazardous material within the storage arrangement 10*a*, 10*b*, 10*c*, 10*d*. This may especially be accomplished by means of the extinguishing fluid outlets 40 disposed on the storage arrangement 10*a*, 10*b*, 10*c*, 10*d*, and also by the extinguishing fluid outlets 50 disposed on the roof 400. For this purpose, the fire protection area may be covered virtually completely up to the roof 400.

The relative mutual arrangement of storage arrangement 10*a*, 10*b*, 10*c*, 10*d*, extinguishing fluid outlets 31, 40, 50 and collecting area 200, especially with the fluid receptacles 201, thus permits control either of liquid hazardous material locally and with standard extinguishing fluids and fighting of any fire events.

Figure 7:
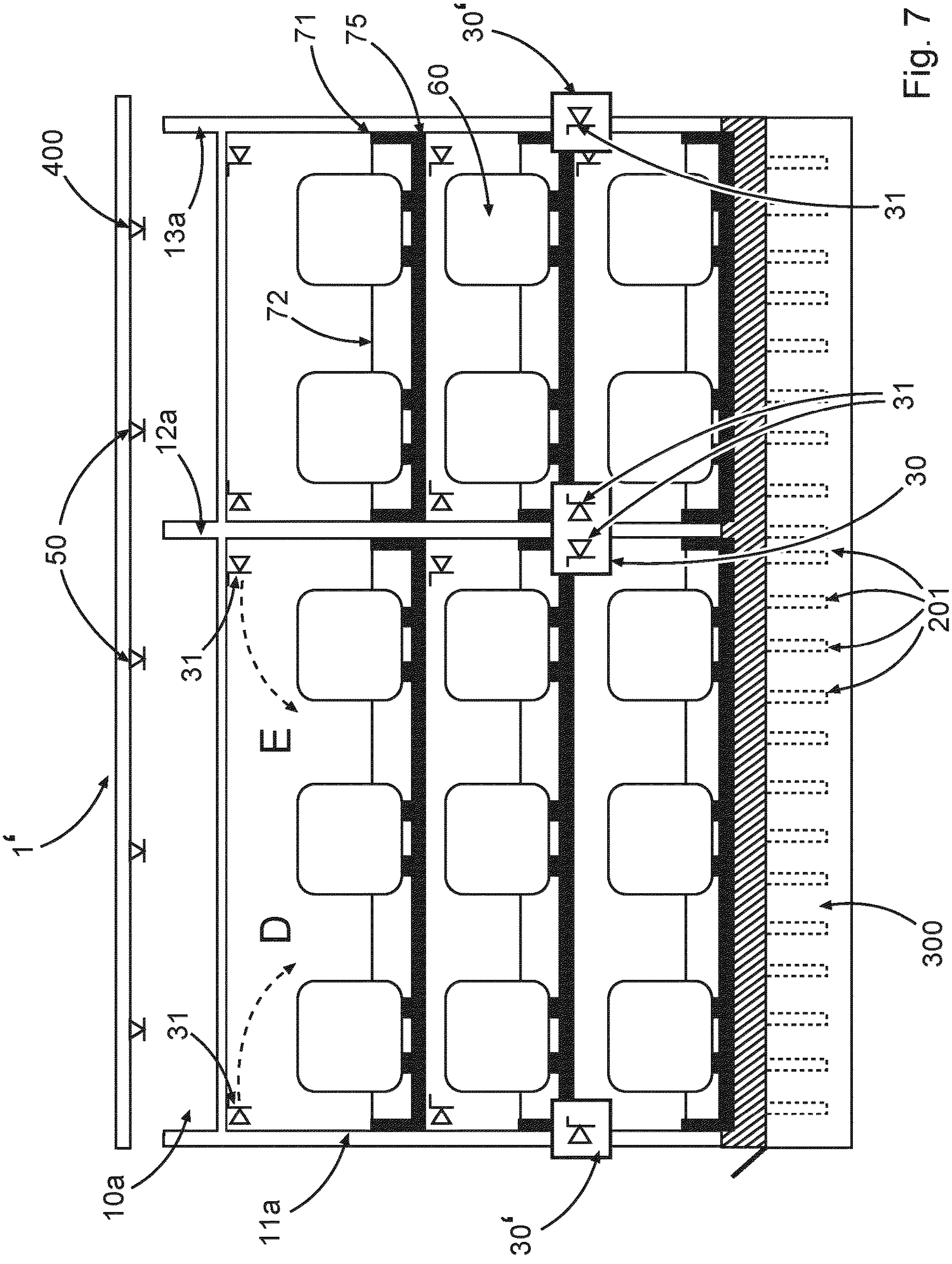
FIG. 7 shows a schematic construction of a front view of a fire protection system in a second embodiment.

FIG. 7 shows a fire protection system 1' of the invention in a second embodiment. The embodiment of FIG. 7 corresponds very substantially to the first embodiment of FIGS. 1 to 3 and shows a view corresponding to FIG. 2. Identical components are given the same reference numerals. The manner of function of the second embodiment of FIG. 7 also corresponds very substantially to the manner of function of the first embodiment of FIG. 2, and therefore there is no further description of this mode of function hereinafter, and reference is made in this respect to FIG. 2.

The difference from the embodiment of FIG. 2 is that, in the embodiment of FIG. 7, a number of extinguishing fluid outlets 31 is disposed not just on the units in block form but also on the storage arrangement. In the embodiment of FIG. 7, rather than a second plurality of extinguishing fluid outlets, extinguishing fluid outlets 31 of the first plurality have been arranged individually on the storage arrangement, which are configured to discharge the extinguishing fluid with a first defined directional characteristic.

In the specific embodiment of FIG. 7, the extinguishing fluid outlets 31 disposed individually on the storage arrangement are particularly configured to wet the storage vessels disposed in the storage arrangement with extinguishing fluid. For this purpose, the extinguishing fluid outlets 31 are preferably disposed at the edges of the individual storage arrangement sections, especially the rack sections, especially on the units 30, 30' in block form, and are aligned such that the exiting extinguishing fluid arrives on the storage vessels. The discharge direction of the extinguishing fluid outlets 31 is shown schematically in FIG. 7 by the arrows D and E.

The advantage of this implementation is that a smaller number of extinguishing fluid outlets may be provided in the storage arrangement without reducing fire protection efficiency. This is because the first plurality of extinguishing fluid outlets, by virtue of its first defined directional characteristic, effectively discharges the extinguishing fluid onto a target area, for example one or two of the storage vessels, whereas the extinguishing fluid outlets of the second plurality (as described in connection with FIG. 2) discharge the extinguishing fluid typically in 360°, which means that no focusing on a particular point is possible.

Although two embodiments have been described above, in which the extinguishing fluid outlets disposed on the storage arrangement are either extinguishing fluid outlets of the first plurality or extinguishing fluid outlets of the second plurality, it will be appreciated at this point that it is also possible to dispose a combination of extinguishing fluid outlets from the first and second plurality on the storage arrangement and/or the roof arrangement in order to fight the fire event. The selection of extinguishing fluid outlets here should particularly be chosen such that it is possible to perform both extinguishing of liquid hazardous material in the collecting area and in the storage arrangement.

LIST OF REFERENCE NUMERALS

Fire protection system 1, 1'
Storage arrangement 10*a*, 10*b*, 10*c*, 10*d*
Positioning elements 11*a*, 12*a*, 13*a*
Elevation 20*a*, 20*b*, 20*c*, 20*d*
Oblique surface 21*a*, 21*b*
Straight surface 22*a*, 22*b*
Fluid barrier element 23*a*, 24*a*
Collecting area 200
Fluid receptacle 201
Fluid barrier element 202
Unit in block form 30, 30'
First plurality of extinguishing fluid outlets 31, 31'
Installation surface 32, 32'
Extinguishing fluid inlet 33
Outlet opening 301
Directing element 302
Floor 300
Roof arrangement 400
Second plurality of extinguishing fluid outlets 40, 50
Storage vessel 60
Fluid-directing elements 70, 70', 70"
Lateral surfaces 71, 72
Base surface 74
Fluid-directing surface 75

The invention claimed is:

1. A fire protection system, comprising:
at least one rack storage arrangement disposed on a floor for storage of at least one vessel containing a liquid hazardous material;
at least one collecting area configured to contain at least the liquid hazard material of the at least one vessel, the at least one collecting area including a base and at least one fluid barrier element; and
a first plurality of extinguishing fluid outlets supported by the at least one rack storage arrangement for discharge of an extinguishing fluid,
wherein, the at least one rack storage arrangement includes at least one fluid-directing element configured to direct an escaped liquid hazardous material from the at least one vessel into the at least one collecting area, and
wherein the at least one rack storage arrangement, the at least one collecting area, and the first plurality of extinguishing fluid outlets are arranged relative to one another such that the first plurality of extinguishing fluid outlets is configured to discharge the extinguishing fluid into the at least one collecting area during a fire event of the escaped liquid hazardous material located in the at least one collecting area.

2. The fire protection system as claimed in claim 1, wherein the first plurality of extinguishing fluid outlets includes at least one spray plate element configured to discharge the extinguishing fluid with a first defined directional characteristic that leads to a discharge of the extinguishing fluid in a direction of the at least one collecting area.

3. The fire protection system as claimed in claim 2, further comprising a second plurality of extinguishing fluid outlets configured to discharge the extinguishing fluid with a second defined directional characteristic.

4. The fire protection system as claimed in claim 1, wherein the at least one rack storage arrangement comprises at least one fluid-tight elevation which is configured to direct the escaped liquid hazardous material from the at least one vessel into the at least one collecting area, and
wherein the at least one fluid-tight elevation has at least one oblique surface that is oblique relative to the floor and which declines in a direction of the at least one collecting area, in order to direct the escaped liquid hazardous material into the at least one collecting area.

5. The fire protection system as claimed in claim 4, wherein the at least one fluid barrier element is connected to the at least one fluid-tight elevation and is configured in order to contain the escaped liquid hazardous material from the at least one vessel within the at least one collecting area.

6. The fire protection system as claimed in claim 1, wherein the at least one fluid-directing element is configured to direct the escaped liquid hazardous material from the at least one vessel into the at least one collecting area, and wherein the at least one fluid-directing element has a base area and at least one oblique fluid-directing surface connected thereto, wherein the fluid-directing element is arranged such that the at least one oblique fluid-directing surface declines in a fluid-directing direction of the at least one collecting area, in order to direct the escaped liquid hazardous material from the at least one vessel into the at least one collecting area.

7. The fire protection system as claimed in claim 6, wherein the at least one fluid-directing element also has at least one lateral surface, wherein the at least one lateral surface is configured in order to provide a barrier that directs the escaped liquid hazardous material from the at least one vessel into the at least one collecting area.

8. The fire protection system as claimed in claim 1, wherein the at least one collecting area has a plurality of fluid receptacles configured to receive the escaped liquid hazardous material from the at least one vessel directed into the collecting area, and wherein the plurality of fluid receptacles is configured to contain at least the liquid hazardous material of the at least one vessel.

9. The fire protection system as claimed in claim 1, wherein the at least one collecting area has a length corresponding to an extension length of at least one fluid-tight elevation, and wherein a first fluid barrier element is disposed at a first end and a second fluid barrier element is disposed at a second end of the length of the collecting area, such that the escaped liquid hazardous material from the at least one vessel is contained within the at least one collecting area.

10. The fire protection system as claimed in claim 1, wherein the first plurality of extinguishing fluid outlets comprises a first subgroup, wherein the first subgroup comprises at least two extinguishing fluid outlets that are disposed as a unit in a block form on the at least one rack storage arrangement, wherein the at least two extinguishing fluid outlets are aligned at a defined angle relative to one another, and wherein the defined angle is not less than 30°.

11. The fire protection system as claimed in claim 1, wherein the first plurality of extinguishing fluid outlets comprises a first subgroup, wherein the first subgroup comprises extinguishing fluid outlets disposed individually on the at least one rack storage arrangement, such that a defined directional characteristic results in a discharge of the extinguishing fluid in a direction of the at least one rack storage arrangement and the at least one vessel.

* * * * *